US009721532B2

United States Patent
Minagawa et al.

(10) Patent No.: US 9,721,532 B2
(45) Date of Patent: Aug. 1, 2017

(54) COLOR CHART DETECTION APPARATUS, COLOR CHART DETECTION METHOD, AND COLOR CHART DETECTION COMPUTER PROGRAM

(71) Applicant: FUJITSU LIMITED, Kawasaki-shi, Kanagawa (JP)

(72) Inventors: Akihiro Minagawa, Tachikawa (JP); Yutaka Katsuyama, Yokohama (JP); Hiroaki Takebe, Kawasaki (JP); Yoshinobu Hotta, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 277 days.

(21) Appl. No.: 14/493,809

(22) Filed: Sep. 23, 2014

(65) Prior Publication Data
US 2015/0009226 A1    Jan. 8, 2015

Related U.S. Application Data

(63) Continuation of application No. PCT/JP2012/058689, filed on Mar. 30, 2012.

(51) Int. Cl.
*G09G 5/06* (2006.01)
*H04N 1/60* (2006.01)
(Continued)

(52) U.S. Cl.
CPC ............ *G09G 5/06* (2013.01); *G01J 3/524* (2013.01); *G06K 9/3216* (2013.01);
(Continued)

(58) Field of Classification Search
CPC ............ H04N 1/6033; G01J 2003/466; G06K 9/3216; G06K 9/4652
See application file for complete search history.

(56) References Cited

U.S. PATENT DOCUMENTS

2008/0304741 A1*  12/2008  Brunner ............ G06K 9/00456
382/168

FOREIGN PATENT DOCUMENTS

JP          6-70345       3/1994
JP       2001-358959    12/2001
(Continued)

OTHER PUBLICATIONS

Lauzière, Color Camera Characterization with an Application to Detection under Daylight Presented at the VI'99 Conference, Trois-Rivières, Québec, Canada, May 19-21, 1999.*
Rattanasakornchai et al., "Compensation Method for Illumination Change by Using Color Chart", The Journal of Imaging Society of Japan, vol. 43, No. 3, Jun. 2004, pp. 142-147.
(Continued)

*Primary Examiner* — Tapas Mazumder
(74) *Attorney, Agent, or Firm* — Staas & Halsey LLP

(57) ABSTRACT

A color chart detection apparatus that detects a color chart from an image representing the color chart having a plurality of palettes arranged in a predefined order is provided. The color chart detection apparatus: extracts any pixel having a color component corresponding to each designated one of a predetermined number of palettes; selects at least three palettes to form a first group and, when a combination of pixels selected on a palette-by-palette basis from among the pixels extracted for the respective palettes included in the first group is arranged in the predefined order, detects each of the pixels included in the combination as being a candidate pixel; and based on the candidate pixel, computes color information representing color of the palette corresponding to the candidate pixel on the image and position information representing position of the corresponding palette on the image.

13 Claims, 15 Drawing Sheets

(51) Int. Cl.
*G06K 9/32* (2006.01)
*G01J 3/52* (2006.01)
*G06K 9/46* (2006.01)
*G01J 3/46* (2006.01)

(52) U.S. Cl.
CPC ...... *H04N 1/6033* (2013.01); *G01J 2003/466* (2013.01); *G06K 9/4652* (2013.01)

(56) References Cited

FOREIGN PATENT DOCUMENTS

| | | |
|---|---|---|
| JP | 2002-152768 | 5/2002 |
| JP | 2010-226580 | 10/2010 |
| WO | 2005/124302 A1 | 12/2005 |

OTHER PUBLICATIONS

International Search Report of PCT/JP2012/058689 mailed Jul. 3, 2012.
Extended European Search Report dated Feb. 27, 2015 in corresponding European Patent Application No. 12872913.4.
Lauzière et al., "Color Camera Characterization with an Application to Detection under Daylight", Vision Interface '99, May 1999, pp. 280-287.
Jisarojito, "Tracking a robot using overhead cameras for RoboCup SPL League", The University of New South Wales School of Computer Science and Engineering, Feb. 17, 2011, 22 pp.
Minagawa et al., "A color chart detection method for automatic color correction", 21$^{st}$ International Conference on Pattern Recognition (ICPR 2012), Nov. 2012, pp. 1912-1915.

* cited by examiner

FIG. 4

| ASPECT RATIO (b/a) | — 401 |
|---|---|
| H OF PALETTE 1 | |
| S OF PALETTE 1 | |
| V OF PALETTE 1 | |
| HORIZONTAL POSITION OF PALETTE 1 (0) | |
| VERTICAL POSITION OF PALETTE 1 (0) | |
| H OF PALETTE 2 | |
| S OF PALETTE 2 | |
| V OF PALETTE 2 | |
| HORIZONTAL POSITION OF PALETTE 2 (1) | |
| VERTICAL POSITION OF PALETTE 2 (0) | |

:

| H OF PALETTE N |
|---|
| S OF PALETTE N |
| V OF PALETTE N |
| HORIZONTAL POSITION OF PALETTE N (5) |
| VERTICAL POSITION OF PALETTE N (3) |

400

FIG. 5A
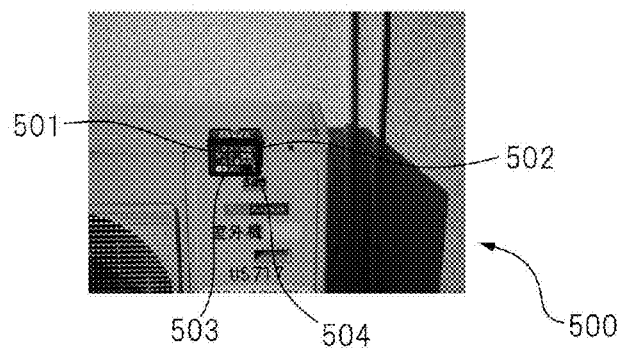
FIG. 5B  FIG. 5C  FIG. 5D
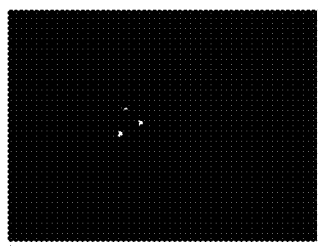  

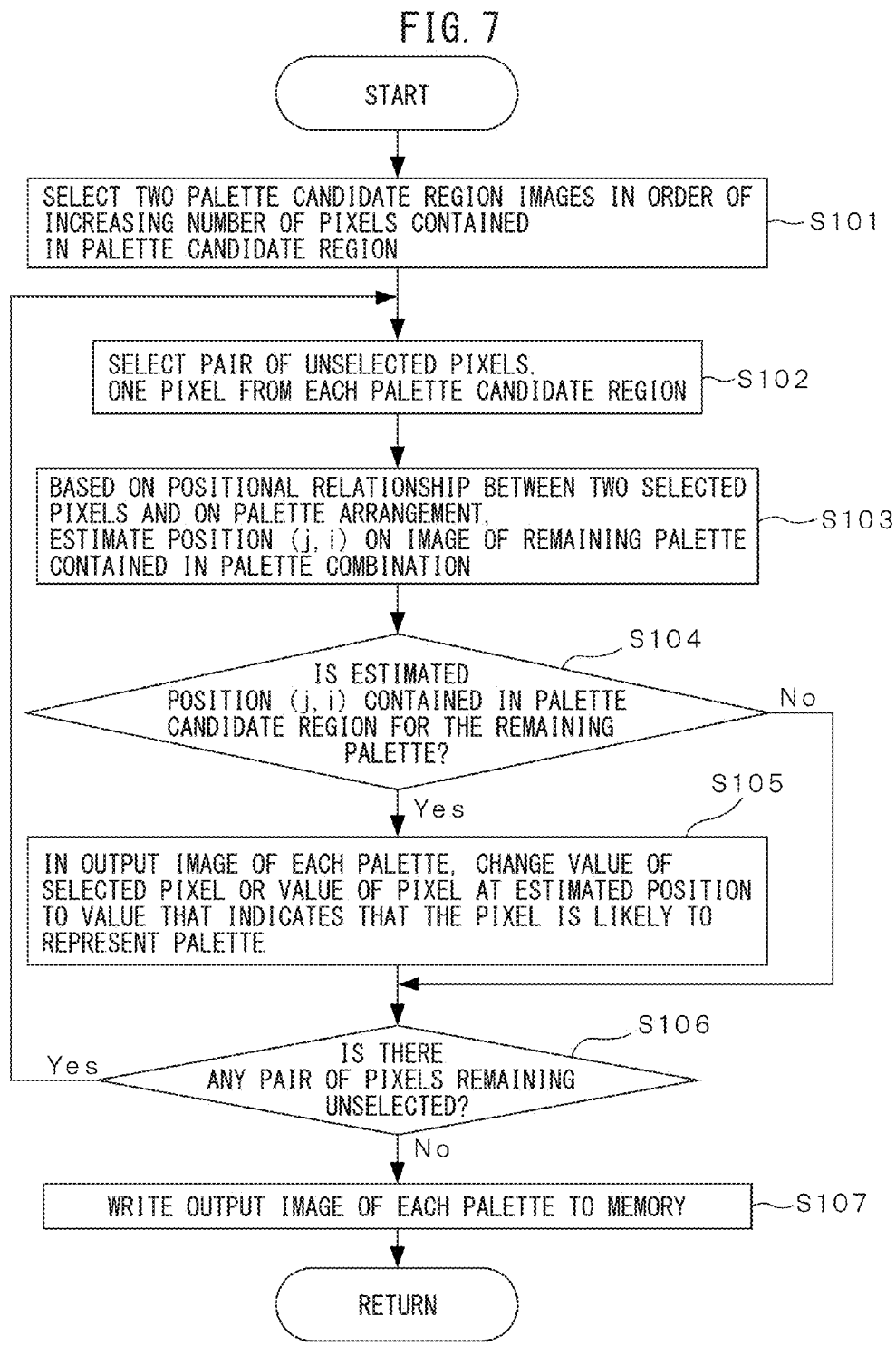

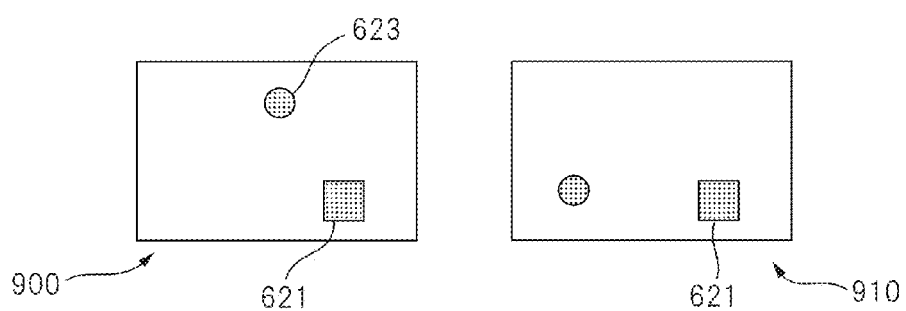
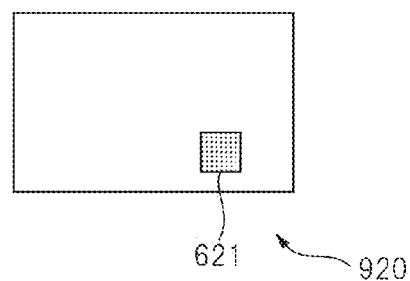

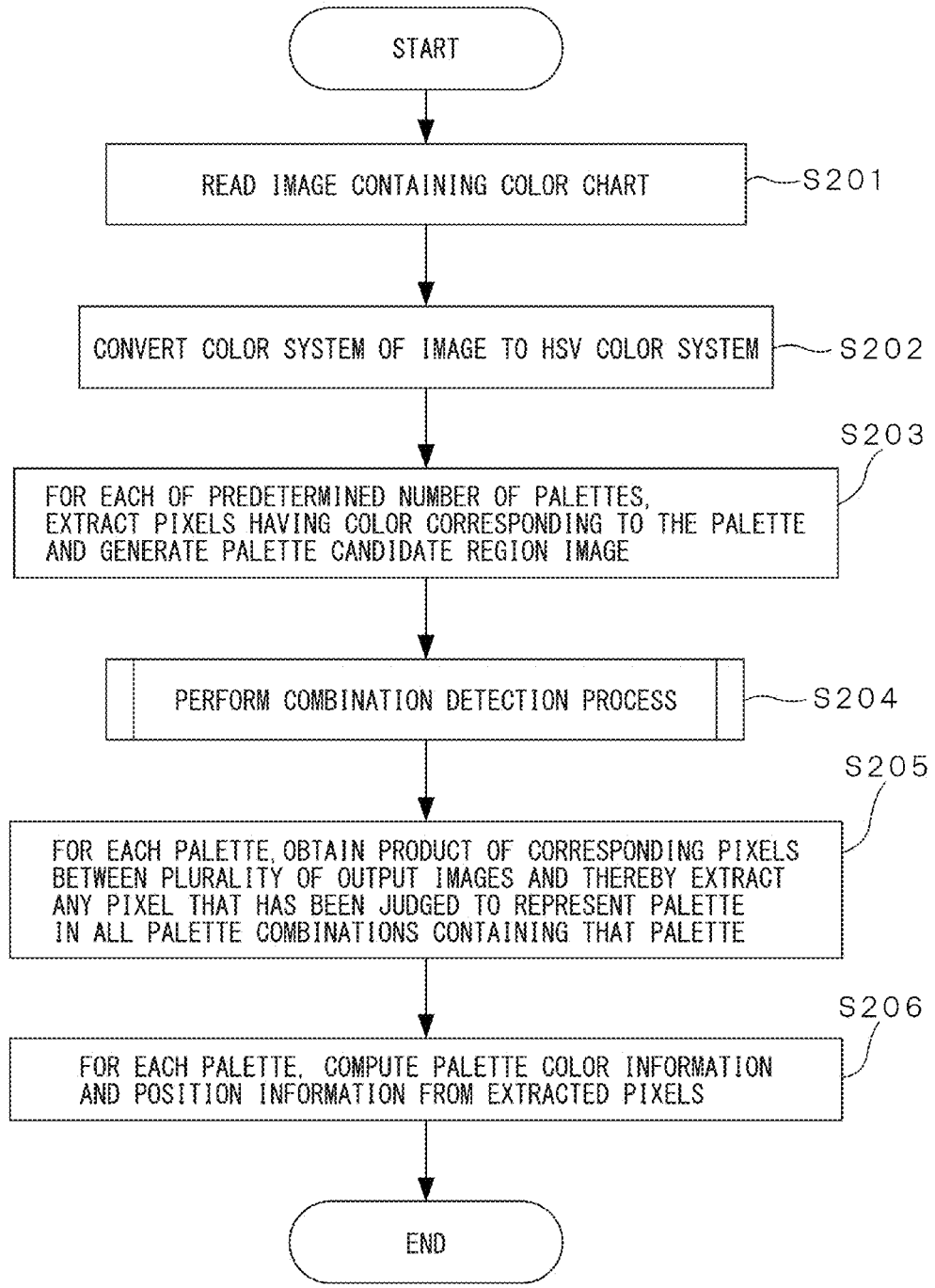

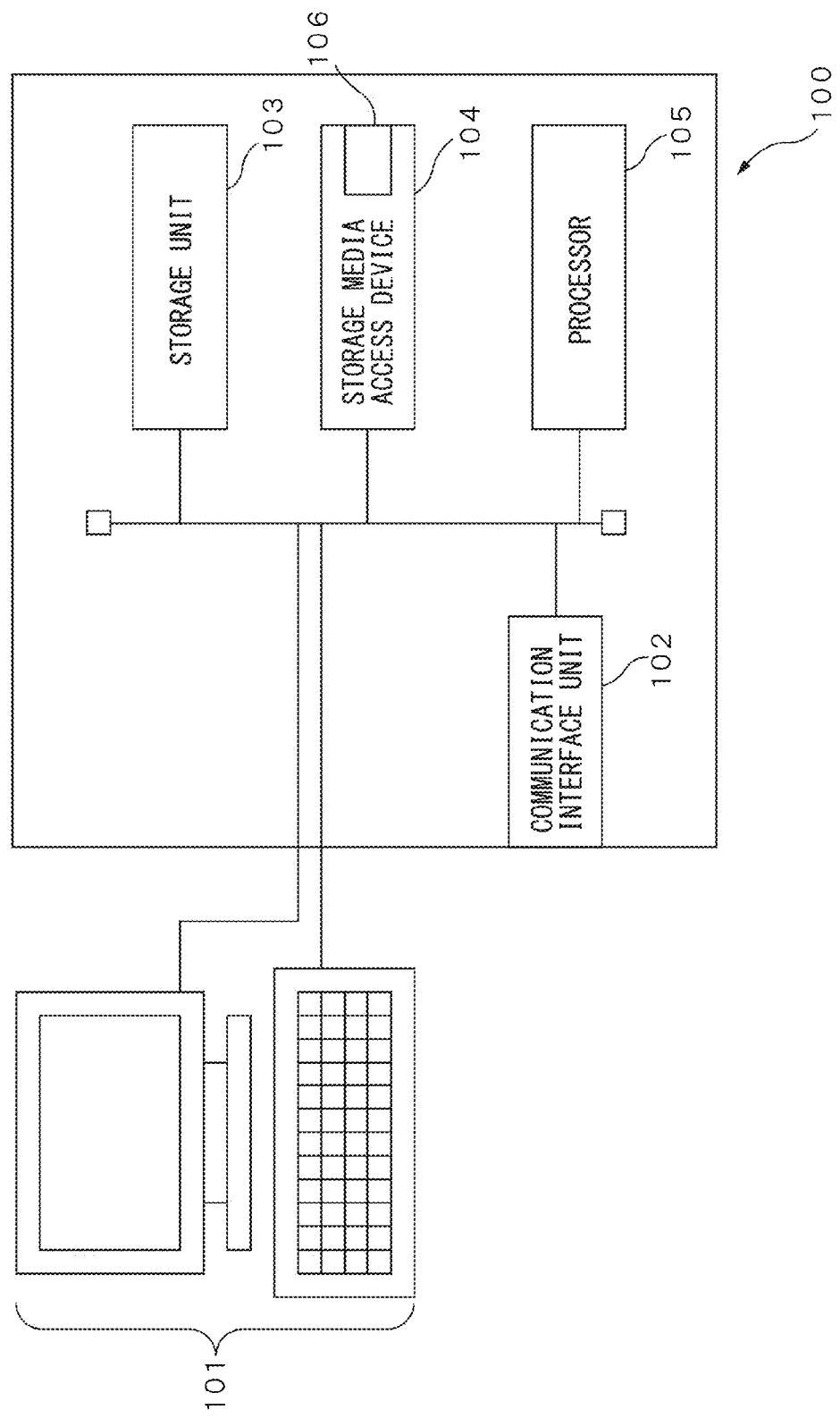

COLOR CHART DETECTION APPARATUS, COLOR CHART DETECTION METHOD, AND COLOR CHART DETECTION COMPUTER PROGRAM

CROSS-REFERENCE TO RELATED APPLICATION

This application is a continuation application and is based upon PCT/JP2012/058689, filed on Mar. 30, 2012, the entire contents of which are incorporated herein by reference.

FIELD

The present invention relates, for example, to a color chart detection apparatus, a color chart detection method and a color chart detection computer program that detects a color chart represented in an image.

BACKGROUND

A color chart is used to correct the color of an image. The color chart has a plurality of palettes, and each palette is differently colored. For each palette, the color of the region containing the palette in the image in which the color chart is carried is compared with the actual color of the palette to measure any change of the color that may have occurred in the process of image generation. Then, by correcting the color of the image so as to cancel out the change of the color, the color of the subject represented on the image can be corrected to appear natural.

For proper color correction, there is a need to identify the position of each palette on the image. In accomplishing this, in the prior art a user had to visually inspect the image displayed on a display, identify the region containing each palette of the color chart on the image, and enter information specifying the position and range containing each individual palette into an apparatus that carries out the color correction. However, the task of specifying the position and range for each individual palette has been troublesome for a user. To address this, various techniques have been proposed for detecting a color chart represented on an image (for example, refer to Japanese Laid-open Patent Publication No. 2002-152768, Japanese Laid-open Patent Publication No. H06-70345 and Japanese Laid-open Patent Publication No. 2010-226580).

For example, Japanese Laid-open Patent Publication No. 2002-152768 discloses a technique for detecting the position of a color chart by performing pattern matching on an image in which the color chart is represented.

On the other hand, Japanese Laid-open Patent Publication No. H06-70345 discloses a technique that converts each sampled image signal into a chromaticity signal and that determines whether the image is a color chart image or not by examining the distribution shape of the chromaticity signals.

Further, Japanese Laid-open Patent Publication No. 2010-226580 discloses a technique that identifies a color reference pattern from an image captured of a two-dimensional code containing the color reference pattern and that extracts the color information to be used for color correction.

SUMMARY

However, pattern matching involves a large amount of computation. In particular, without the information specifying the position of the color chart, the color chart detection apparatus would have to examine the degree of matching by scanning across the entire image while changing the position of the template corresponding to the color chart on the image. As a result, the amount of computation needed for identifying the position of the color chart would be enormous. On the other hand, when using a digital camera or a portable terminal such as a mobile phone to detect a color chart, it is preferable to minimize the amount of computation because of power consumption and other limitations. Further, in the case of a digital camera or a portable terminal, since hardware resources available for color chart detection are also limited, if the amount of computation is large, the time needed to detect the color chart increases correspondingly, which reduces user convenience.

On the other hand, the technique disclosed in Japanese Laid-open Patent Publication No. H06-70345 is intended to determine the presence or absence of a color chart based on the statistical quantity of the color distribution but is not intended to detect the position of a color chart on the image. Furthermore, the color chart may be captured into the image along with other subjects, in which case the area that the color chart occupies in the image is smaller than the area occupied by other subjects or background. Since the shape of the color distribution obtained from such an image is dependent on the color distribution of other subjects or background rather than on the color chart, it may not be possible with the technique disclosed in Japanese Laid-open Patent Publication No. H06-70345 to accurately determine the presence or absence of a color chart.

In the technique disclosed in Japanese Laid-open Patent Publication No. 2010-226580, a two-dimensional code with a known shape is detected in order to identify the position of a color chart on the image. However, according to this technique, the color chart has to be included in the two-dimensional code, and it is not possible to detect the position of the color chart on the image with the color chart itself. Furthermore, each individual palette included in the color chart has a conventional shape such as a rectangle, and the palette itself is substantially uniform. Accordingly, the characteristic geometrical features of the color chart are, in effect, only the corners of each palette, but other subjects captured along with the color chart may also have such corners. As a result, if it is attempted to detect the color chart from the image based on such geometrical features, the color chart may not be detected with sufficient accuracy.

According to one embodiment, a color chart detection apparatus that detects a color chart from an image representing the color chart, the color chart including a plurality of palettes arranged in a predefined order is provided. The color chart detection apparatus includes: a palette color pixel extracting unit which, for each of a predetermined number, not smaller than three, of palettes selected from among the plurality of palettes, extracts any pixel having a color component corresponding to the palette from the image; a combination detecting unit which selects at least three palettes from the predetermined number of palettes to form a first group and which, when a combination of pixels selected on a palette-by-palette basis from among the pixels extracted for the respective palettes included in the first group is arranged in the same predefined order as the palettes, detects each of the pixels included in the combination as being a candidate pixel that is likely to represent a corresponding one of the palettes included in the first group; and a palette information computing unit which, based on the candidate pixel, computes color information representing color of the palette corresponding to the candidate pixel on the image and position information representing position of the corresponding palette on the image.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 4 is a diagram illustrating one example of color chart information.

FIG. 5A is a diagram illustrating one example of an image representing a color chart.

FIG. 5B is a diagram illustrating a palette candidate region image which represents a set of pixels extracted from the image of FIG. 5A as having color components corresponding to a palette of green.

FIG. 5C is a diagram illustrating a palette candidate region image which represents a set of pixels extracted from the image of FIG. 5A as having color components corresponding to a palette of red.

FIG. 5D is a diagram illustrating a palette candidate region image which represents a set of pixels extracted from the image of FIG. 5A as having color components corresponding to a palette of yellow.

FIG. 7 is an operation flowchart illustrating a combination detection process.

FIG. 9A is a diagram illustrating one example of an output image generated for a palette k2 as a result of the combination detection process performed on a palette combination containing palettes k1 to k3.

FIG. 9B is a diagram illustrating one example of an output image generated for the palette k2 as a result of the combination detection process performed on another palette combination containing the palette k2.

FIG. 9C is a diagram illustrating one example of an image generated as the product of the output image depicted in FIG. 9A and the output image depicted in FIG. 9B.

FIG. 10 is an operation flowchart illustrating a color chart detection process according to the first embodiment.

FIG. 15 is a diagram illustrating the configuration of a computer that operates as the color chart detection apparatus by executing a computer program for implementing the function of each unit of the color chart detection apparatus according to each of the embodiments or their modified examples.

DESCRIPTION OF EMBODIMENTS

Color chart detection apparatus according to various embodiments will be described below with reference to the drawings.

The color chart detection apparatus extracts, from an image representing a color chart, regions having colors corresponding to the colors of several palettes, including a specific palette, selected from among a plurality of palettes contained in the color chart. Then, among the regions corresponding to the colors of the palettes in the selected palette combination containing the specific palette, the color chart detection apparatus detects any region that matches the arrangement of the palettes as being the region that is likely to actually represent the corresponding palette. The color chart detection apparatus performs the same processing on a plurality of palette combinations each containing the specific palette, and determines that the region detected as being likely to represent the specific palette for all the combinations of palettes is the region representing that specific palette.

Figure 1:
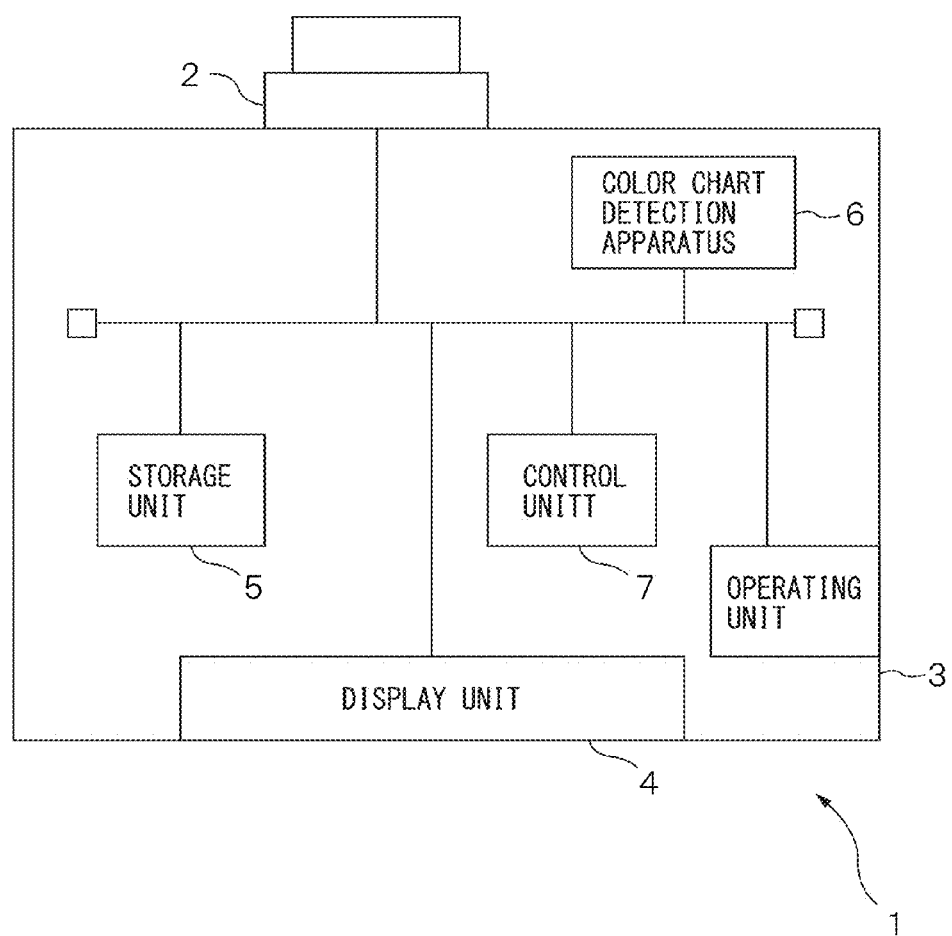
FIG. 1 is a diagram illustrating the configuration of an imaging apparatus incorporating a color chart detection apparatus.

FIG. 1 is a diagram illustrating schematically the configuration of an imaging apparatus incorporating the color chart detection apparatus according to each embodiment or its modified example. The imaging apparatus 1 is, for example, a digital camera or a camera-equipped mobile phone. As illustrated in FIG. 1, the imaging unit 1 includes, in addition to the color chart detection apparatus 6, a camera module 2, an operating unit 3, a display unit 4, a storage unit 5, and a control unit 7. The imaging apparatus 1 may further include an interface circuit (not depicted) conforming to a serial bus standard such as Universal Serial Bus in order to connect the imaging apparatus 1 to another apparatus such as a computer or a television receiver. The control unit 7 is connected to the other component elements of the imaging apparatus 1, for example, via a bus.

The camera module 2 includes an image sensor having an array of solid-state imaging devices arranged in two dimensions, and imaging optics for focusing an image of a subject on the image sensor. The camera module 2 generates an image representing a subject by shooting the subject with the aperture opening and shutter speed set up by the control unit 7. The camera module 2 stores the generated image in the storage unit 5. In the present embodiment, the color chart is contained in the subject.

In the present embodiment, the generated image is a color image represented by the RGB color system, each color having an 8-bit gray scale intensity. The number of bits used to represent the gray scale intensity of each color component is not limited to 8 bits, but may be, for example, 4 bits or 10 bits. Further, the color image from which the color chart is to be detected may be represented by some other color system.

Figure 2:
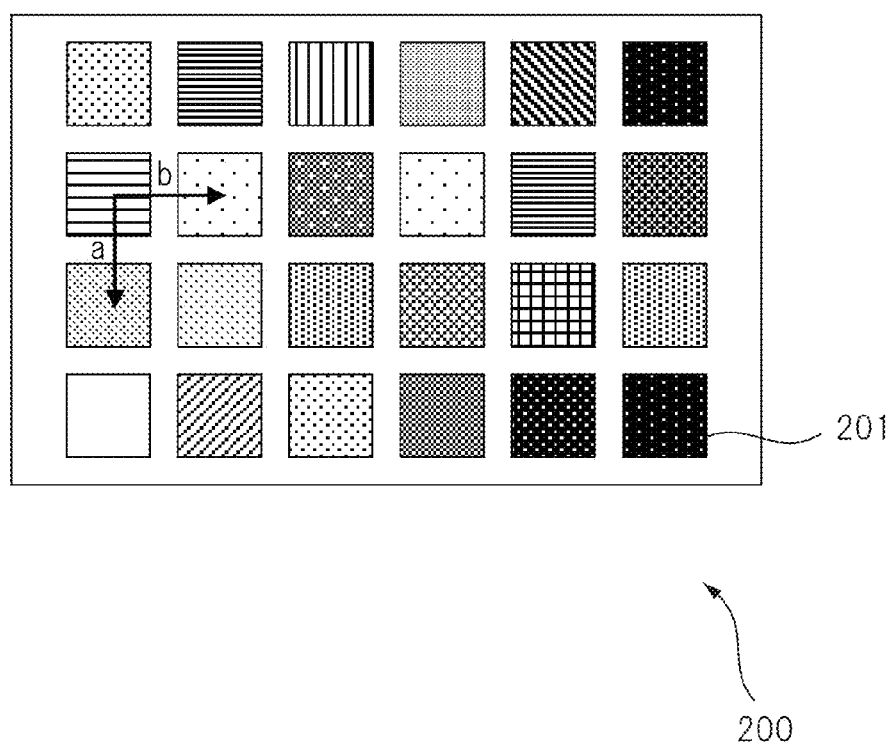
FIG. 2 is a diagram illustrating one example of a color chart.

FIG. 2 is a diagram illustrating one example of the color chart. In the color chart 200 depicted in FIG. 2, a total of 24 palettes are arranged in an array of six palettes horizontally and four palettes vertically. Each palette 201 has a rectangular shape and is differently colored. The center-to-center distance between any two vertically adjacent palettes is "a", and the center-to-center distance between any two horizontally adjacent palettes is "b".

The operating unit 3 includes, for example, various kinds of operating buttons or dial switches for the user to operate the imaging apparatus 1. Then, in response to the user operation, the operating unit 3 sends a control signal for starting the shooting, focusing, or other action, or a setup signal for setting up the shutter speed, aperture opening, etc., to the control unit 7.

The display unit 4 includes, for example, a display device such as a liquid crystal display device, and displays various kinds of information received from the control unit 7 or the image generated by the camera module 2. The operating unit 3 and the display unit 4 may be combined into one unit using, for example, a touch panel display.

The storage unit 5 includes, for example, a readable/writable volatile or nonvolatile semiconductor memory circuit. The storage unit 5 stores the image received from the camera module 2. The storage unit 5 may pass the stored image to the color chart detection apparatus 6 in response to a read request received from the color chart detection apparatus 6 or may store color information and position information of each palette received from the color chart detection apparatus 6. If the functions of the color chart detection apparatus 6 are to be implemented by executing a computer program on a processor incorporated in the control unit 7, then the computer program and various kinds of data to be used during the execution of the color chart detection process may be stored in the storage unit 5.

The color chart detection apparatus 6 detects the color chart from the image generated by the camera module 2. Then, the color chart detection apparatus 6 passes information representing the color and position of each palette of the color chart on the image to the control unit 7. The details of the color chart detection apparatus 6 will be described later.

The control unit 7 includes at least one processor and its peripheral circuitry, and controls the entire operation of the imaging apparatus 1. The control unit 7 sets up the shutter speed or aperture opening, for example, in accordance with the amount of exposure for the subject and the setup signal received from the operating unit 3. Further, the control unit 7 may apply processing such as edge enhancement or contrast enhancement to the image generated by the camera module 2. Alternatively, the control unit 7 may adjust the color correction to be applied to the image, based on the color information received from the color chart detection apparatus 6 for the region judged to represent the specific palette.

Figure 3:
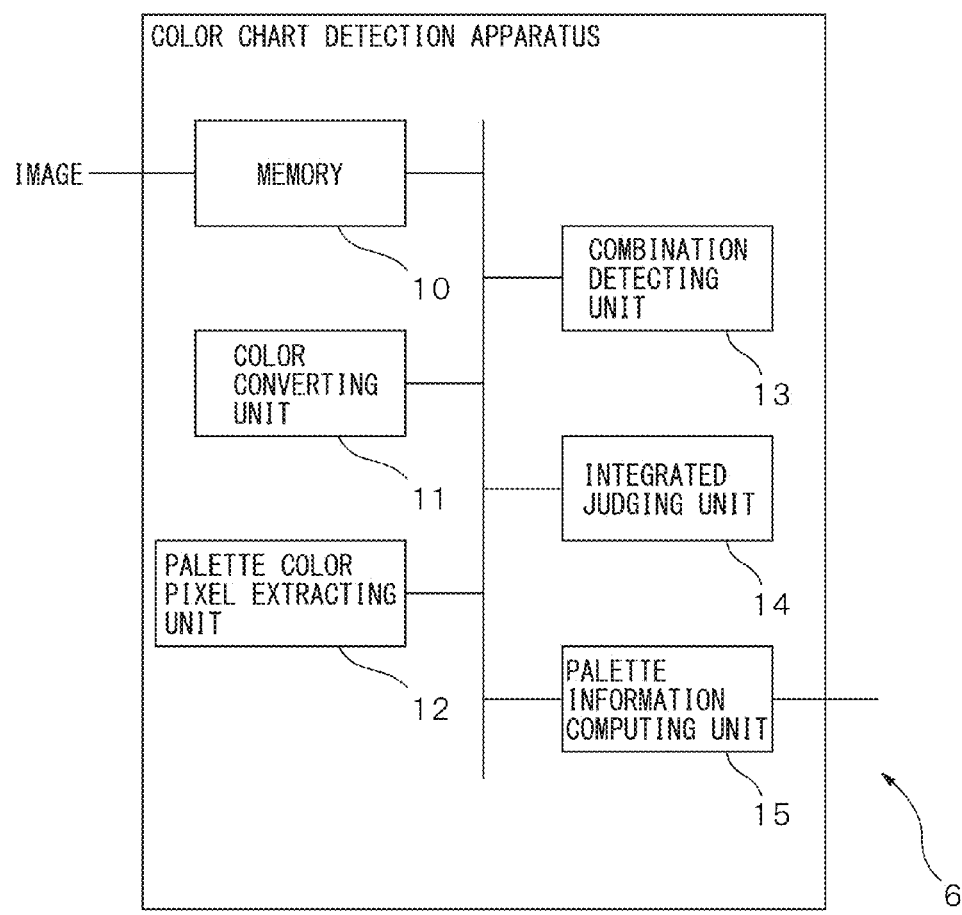
FIG. 3 is a diagram illustrating the configuration of a color chart detection apparatus according to a first embodiment.

Each element of the color chart detection apparatus 6 will be described below. FIG. 3 is a diagram illustrating the configuration of the color chart detection apparatus 6. The color chart detection apparatus 6 includes a memory 10, a color converting unit 11, a palette color pixel extracting unit 12, a combination detecting unit 13, an integrated judging unit 14, and a palette information computing unit 15. These units constituting the color chart detection apparatus 6 are implemented in the form of a single integrated circuit on which circuits corresponding to the respective units are integrated. Alternatively, these units constituting the color chart detection apparatus 6 may each be implemented as a separate circuit.

The memory 10 includes, for example, a read-only nonvolatile semiconductor memory circuit and a readable/writable volatile semiconductor memory circuit. The memory 10 stores various data that the color chart detection apparatus 6 uses to detect a color chart from an image, for example, various kinds of information such as information concerning the color chart to be detected and information indicating the combination of palettes to be used for palette detection. The memory 10 also stores various intermediate calculation results obtained during the execution of the color chart detection process, which include, for example, a palette candidate region image which represents a palette candidate region as a set of pixels each having a color corresponding to the color of a specific individual palette. The various kinds of information and the palette candidate region image will be described in detail later.

The color converting unit 11 converts the color system of the image generated by the camera module 2 from the RGB color system to the HSV color system. For this purpose, the color converting unit 11 converts the value of each pixel in accordance with the following equations.

$$H = \begin{cases} 60 \times \dfrac{G-B}{MAX-MIN} & \text{if } MAX = R \\ 60 \times \dfrac{B-R}{MAX-MIN} + 120 & \text{if } MAX = G \\ 60 \times \dfrac{R-G}{MAX-MIN} + 240 & \text{if } MAX = B \end{cases} \quad (1)$$

$$S = \frac{MAX - MIN}{MAX}$$

$$V = MAX$$

where R, G, and B respectively represent the red, green, and blue components of the pixel before conversion. Further, MAX and MIN respectively represent the maximum and minimum values among the red, green, and blue components of the pixel before conversion. H, S, and V respectively represent the hue, saturation, and value of the converted pixel.

The color converting unit 11 passes the image represented by the HSV color system to the palette color pixel extracting unit 12. If the image received by the color chart detection apparatus 6 is already represented by the HSV color system, the color converting unit 11 may be omitted.

For each palette, the palette color pixel extracting unit 12 extracts pixels having color components corresponding to the color of the palette from the image representing the color chart and represented by the HSV color system, and generates a palette candidate region image representing a palette candidate region represented by the set of extracted pixels.

For this purpose, the palette color pixel extracting unit 12 refers to the color chart information stored in the memory 10 and, from the color chart information, identifies the representative values of the H, S, and V components of the palette to be detected.

FIG. 4 is a diagram illustrating one example of the color chart information. In the illustrated example, the color chart information is expressed as a one-dimensional vector. The top element 401 stores the palette aspect ratio (b/a), i.e., the ratio of the center-to-center distance "b" between two horizontally adjacent palettes to the center-to-center distance "a" between two vertically adjacent palettes. Following the element 401, information for each palette as a set of five elements is stored, for example, in raster scan order. For example, the set of five elements that immediately follows the element 401 stores the representative values H(1), S(1), and V(1) of the H, S, and V components of the palette 1 located at top left, the position of the palette in the color chart as counted from the left end thereof, and the position of the palette in the color chart as counted from the top end thereof.

The palette color pixel extracting unit 12 sets a detection range centered about the representative value of each component. For example, for the H component, the palette color pixel extracting unit 12 sets a range of ±10 degrees from the representative value of the H component as the detection range. Similarly, the palette color pixel extracting unit 12 sets a range of ±50 from the representative value of the S component as the detection range for the S component, and sets a range of ±80 from the representative value of the V component as the detection range for the V component. These detection ranges need only be set suitably according to the characteristics of the camera module 2 so that the respective components of each pixel of the palette in the image will be contained within the respective detection ranges, and each detection range need not necessarily be set symmetrically as the representative value of the corresponding component.

For each pixel in the image forming the palette to be detected, the palette color pixel extracting unit 12 determines whether the respective components of the pixel are contained within the respective detection ranges set for the palette. If the respective components of the pixel are contained within the respective detection ranges, the palette color pixel extracting unit 12 extracts the pixel as a pixel having a color corresponding to the color of the palette to be detected.

The palette color pixel extracting unit 12 generates a palette candidate region image in order to indicate the pixels extracted as the pixels corresponding to the palette to be detected. The palette candidate region image is, for example, a gray image or binary image of the same size as the image representing the color chart, and the value of the pixels identical in position to the extracted pixels is set to "1", while the value of the other pixels is set to "0".

FIG. 5A is a diagram illustrating one example of the image representing the color chart. In FIG. 5A, the image 500 represents the color chart 501 to be detected. The color chart 501 contains a palette 502 of green, a palette 503 of red, and a palette 504 of yellow.

FIG. 5B depicts a palette candidate region image 510 which represents a set of pixels extracted from the image 500 of FIG. 5A as having color components corresponding to the green palette 502. Likewise, FIG. 5C depicts a palette candidate region image 520 which represents a set of pixels extracted from the image 500 of FIG. 5A as having color components corresponding to the red palette 503. FIG. 5D depicts a palette candidate region image 530 which represents a set of pixels extracted from the image 500 of FIG. 5A as having color components corresponding to the yellow palette 504. In each of the palette candidate region images 510 to 530, pixels displayed in white indicate the extracted pixels. As depicted in FIGS. 5B to 5D, the respective palette candidate region images contains the extracted pixels representing the respective palettes 502 to 504 to be detected. It can also be seen from each palette candidate region image that the pixels representing the background having a color close to the color of the palette to be detected are also extracted.

The palette color pixel extracting unit 12 stores the palette candidate region image generated for each palette in the memory 10.

Since the arrangement of the palettes in the color chart is predetermined, it is believed that the pixels representing the respective palettes are also arranged on the image in the same order as the palettes. On the other hand, among the pixels contained in the image other than those contained in the color chart, there may be pixels whose color is similar to the color of any one of the palettes. In that case, the pixels having colors similar to the colors of the respective palettes are also extracted. However, these pixels are arranged in a manner unrelated to the arrangement of the palettes.

Figure 6A:
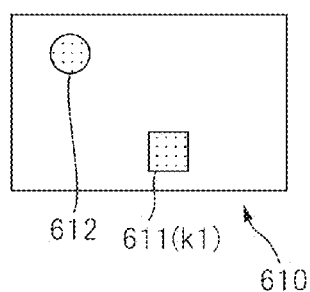
FIG. 6A is a schematic diagram illustrating a palette candidate region image representing sets of pixels extracted for three palettes from an image captured by shooting a color chart.
Figure 6B:
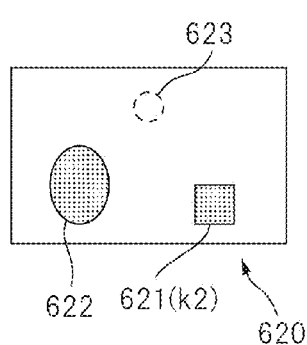
FIG. 6B is a schematic diagram illustrating a palette candidate region image representing sets of pixels extracted for three palettes from an image captured by shooting a color chart.
Figure 6C:
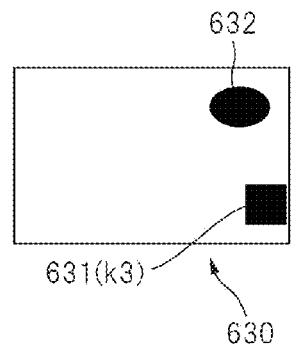
FIG. 6C is a schematic diagram illustrating a palette candidate region image representing sets of pixels extracted for three palettes from an image captured by shooting a color chart.

This will be explained with reference to FIGS. 6A to 6D. FIGS. 6A to 6C are schematic diagrams illustrating palette candidate region images 610 to 630 respectively representing the sets of pixels extracted for palettes k1 to k3 from an image captured by shooting a color chart in which the palettes k1, k2, and k3 are arranged in this order from left to right. In the palette candidate region image 610, not only a region 611 representing the palette k1 but a region 612 representing a background portion having a color similar to the color of the palette k1 is also extracted. Similarly, in the palette candidate region image 620, not only a region 621 representing the palette k2 but a region 622 representing a background portion having a color similar to the color of the palette k2 is also extracted. In the palette candidate region image 630, not only a region 631 representing the palette k3 but a region 632 representing a background portion having a color similar to the color of the palette k3 is also extracted.

Figure 6D:
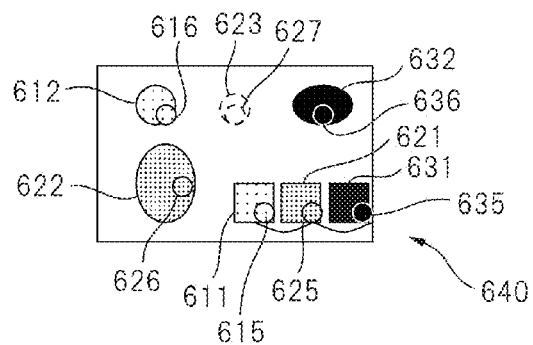
FIG. 6D is a schematic diagram illustrating an image in which the extracted pixels in the palette candidate region images of FIGS. 6A to 6C are arranged in the same plane.

FIG. 6D is a schematic diagram illustrating an image 640 in which the extracted pixels in the respective palette candidate region images 610 to 630 are arranged in the same plane. Arbitrary pixels 615, 625, and 635 taken from the regions 611, 621, and 631 representing the palettes k1 to k3, respectively, are arranged from left to right in the same order in which the respective palettes k1 to k3 are arranged. On the other hand, arbitrary pixels 616, 626, and 636 taken from the regions 612, 622, and 632 representing the background portions, respectively, are arranged in an order different from the order in which the respective palettes k1 to k3 are arranged. It can therefore be seen that the regions 612, 622, and 632 do not represent the palettes k1 to k3.

Then, in a palette combination containing three or more palettes, i.e., a palette group, the combination detecting unit 13 selects one pixel from the set of pixels extracted for each palette, and examines whether the selected pixels are arranged in the same order in which the respective palettes are arranged. In this way, from among the pixels extracted for each palette contained in the combination, the combination detecting unit 13 detects any pixel that is likely to actually represent the palette.

Since the distance from the imaging apparatus 1 to the color chart is unknown, the size of the color chart and the distance between each palette on the image are not known. However, the ratio of the distance between a given pair of palettes to the distance between another pair of palettes remains invariant, irrespective of the distance from the imaging apparatus 1 to the color chart.

Then, based on the ratio of the distance between the pixels selected from the palette candidate regions corresponding to two of the palettes contained in the palette combination under consideration to the distance between the two of the palettes, the combination detecting unit 13 estimates the position of any pixel contained in another palette. If the pixel whose position is estimated is contained in the palette candidate region of the other palette, the combination detecting unit 13 determines that the selected pixels and the pixel at the estimated position are highly likely to represent the respective palettes.

FIG. 7 is an operation flowchart illustrating the combination detection process performed by the combination detecting unit 13.

In a palette combination containing three or more palettes, the combination detecting unit 13 selects, from among the palette candidate region images, two palette candidate region images in order of increasing number of pixels contained in the palette candidate region (step S101). For example, in the case of the palette candidate region images depicted in FIGS. 6A to 6C, the number of pixels contained in the palette candidate region image 610 corresponding to the palette k1 and the number of pixels contained in the palette candidate region image 630 corresponding to the palette k3 are smaller. Therefore, the palette candidate region images 610 and 630 are selected. Since this serves to minimize the number of pixel pairs to be selected, the combination detecting unit 13 can suppress an increase in the amount of computation.

The combination detecting unit 13 selects a pair of unselected pixels, one pixel from each of the palette candidate regions in the two selected palette candidate region images (step S102). Then, based on the positional relationship between the two selected pixels and on the arrangement of the palettes corresponding to the regions containing the selected pixels, the combination detecting unit 13 estimates the position on the image of the remaining palette contained in the combination (step S103).

A description will be given below of how the estimated position of a pixel contained in the remaining palette on the image is calculated from the two selected pixels.

First, the combination detecting unit 13 obtains a vector (x1, y1) representing the amount of shift by one palette in the horizontal direction on the image and a vector (x2, y2) representing the amount of shift by one palette in the vertical direction on the image. The elements x1, x2, y1, and y2 of the vectors are expressed in units of pixels.

When the color chart is arranged so that its horizontal direction is parallel to the horizontal direction of the image, (x1, y1) and (x2, y2) are calculated from the two selected pixels in accordance with the following equations.

$$(j2-j1)=x1\times\{(Ph(k2)-Ph(k1)\}$$

$$y1=0$$

$$x2=0$$

$$(i2-i1)=y1\times\{(Pv(k2)-Pv(k1)\} \qquad (2)$$

where (j1, i1) represents the horizontal and vertical coordinates of the selected pixel for the palette k1. On the other hand, (j2, i2) represents the horizontal and vertical coordinates of the selected pixel for the palette k2. Ph(k1) and Ph(k2) represent the palette numbers of the respective palettes k1 and k2 as counted from the left end of the color chart. On the other hand, Pv(k1) and Pv(k2) represent the palette numbers of the respective palettes k1 and k2 as counted from the top end of the color chart.

Next, referring to drawings, a description will be given for the case where the horizontal direction of the color chart is not parallel to the horizontal direction of the image.

Figure 8B:
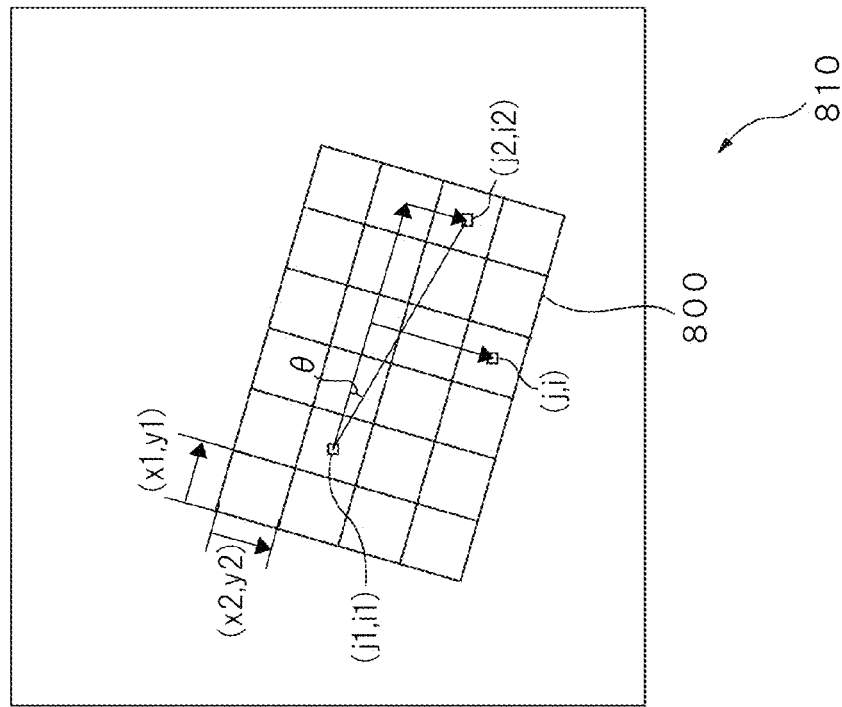
FIG. 8B is a schematic diagram of an image in which the color chart is represented.
Figure 8A:
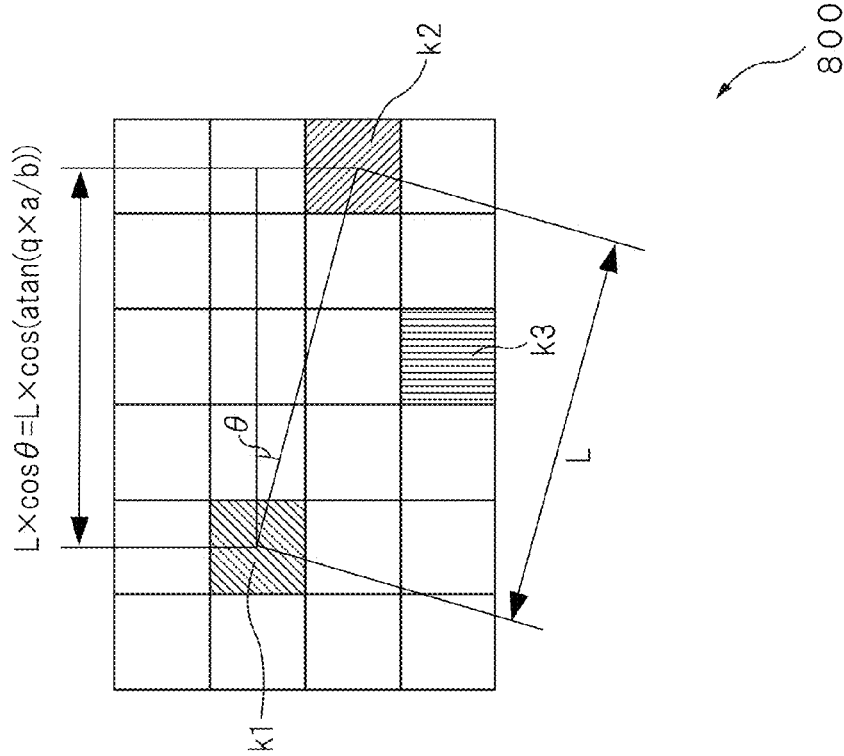
FIG. 8A is a diagram illustrating one example of a combination of palettes selected from a color chart.

FIG. 8A is a diagram illustrating one example of a combination of palettes selected from a color chart 800. FIG. 8B is a schematic diagram of an image 810 on which the color chart 800 is represented. In the illustrated example, a palette k1{Ph(k1)=1, Pv(k1)=1}, located in the second column and second row as counted from the left end and top end, respectively, of the color chart 800, a palette k2{Ph(k2)=5, Pv(k2)=2}, located in the sixth column and third row as counted from the left end and top end, respectively, and a palette k3{Ph(k3)=3, Pv(k3)=3}, located in the fourth column and fourth row as counted from the left end and top end, respectively, are selected. Then, the position of a pixel contained in the palette k3 is estimated from the pixel contained in the palette candidate region for the palette k1 and the pixel contained in the palette candidate region for the palette k2

The angle θ, which represents the differences of the angle between vector (x1, y1) to palette k1 and vector (j2−j1, i2−i1) to palette k2, is expressed by the following equation.

$$\theta = a\tan([\{Pv(k2) - Pv(k1)\} \times a] / [\{Ph(k2) - Ph(k1)\} \times b]) \qquad (3)$$

$$= a\tan(q \times a/b)$$

$$q = \{Pv(k2) - Pv(k1)\} / \{Ph(k2) - Ph(k1)\}$$

when $$[Ph(k2) - Ph(k1)] = 0$$

$$a\tan(q \times a/b) = \pi/2$$

The relationship between the vectors (x1, y1) and (j2−j1, i2−i1) and the angle θ expressed by the equation (3) also holds for the image 810 in which the color chart 800 is tilted as depicted in FIG. 8B. When the distance between the palettes k1 and k2 is denoted by L, the horizontal and vertical distances between k1 and k2 are respectively given as:

$$L \times \cos(a\tan(q \times a/b))$$

$$L \times \sin(a\tan(q \times a/b))$$

Accordingly, the distance over which a shift is made by one palette in the horizontal or vertical direction, respectively, is calculated by dividing the horizontal or vertical distance by the number of palettes located in the horizontal or vertical direction between k1 and k2. In the image 810, L corresponds to the distance between the pixel (j1, i1) and the pixel (j2, i2). Hence, the following equations hold.

$$\mathrm{sqrt}\{(j2-j1)*(j2-j1)+(i2-i1)*(i2-i1)\}\cos\theta=x1\times\{Ph(k2)-Ph(k1)\}$$

$$\mathrm{sqrt}\{(j2-j1)*(j2-j1)+(i2-i1)*(i2-i1)\}\sin\theta=y1\times\{Ph(k2)-Ph(k1)\}$$

$$\mathrm{sqrt}\{(j2-j1)*(j2-j1)+(i2-i1)*(i2-i1)\}\cos\theta=x2\times\{Pv(k2)-Pv(k1)\}$$

$$\mathrm{sqrt}\{(j2-j1)*(j2-j1)+(i2-i1)*(i2-i1)\}\sin\theta=y2\times\{Pv(k2)-Pv(k1)\}$$

Accordingly, when [Ph(k2)−Ph(k1)] is not 0, the vector (x1, y1) is calculated by the following equations.

$$x1=\mathrm{sqrt}\{(j2-j1)*(j2-j1)+(i2-i1)*(i2-i1)\}/\{Ph(k2)-Ph(k1)\}\times\cos(a\tan(q\times a/b))$$

$$y1=\mathrm{sqrt}\{(j2-j1)*(j2-j1)+(i2-i1)*(i2-i1)\}/\{Ph(k2)-Ph(k1)\}\times\sin(a\tan(q\times a/b)) \qquad (5)$$

When [Ph(k2)−Ph(k1)] is 0, the vector (x1, y1) is calculated by the following equations.

$$x1 = y2 \times b/a$$

$$y1 = -x2 \times b/a \quad (6)$$

Further, when [Pv(k2)−Pv(k1)] is not 0, the vector (x2, y2) is calculated by the following equations.

$$x2 = \text{sqrt}\{(j2-j1)*(j2-j1)+(i2-i1)*(i2-i1)\}/\{Pv(k2)-Pv(k1)\} \times \cos(a \tan(q \times a/b))$$

$$y2 = \text{sqrt}\{(j2-j1)*(j2-j1)+(i2-i1)*(i2-i1)\}/\{Pv(k2)-Pv(k1)\} \times \sin(a \tan(q \times a/b)) \quad (7)$$

When [Pv(k2)−Pv(k1)] is 0, the vector (x2, y2) is calculated by the following equations.

$$x2 = -y1 \times a/b$$

$$y2 = x1 \times a/b \quad (8)$$

Accordingly, the estimated position (j, i) of the pixel contained in the palette k3 is calculated by the following equations.

$$j = x1 \times \{Ph(k3)-Ph(k1)\} + x2 \times \{Pv(k3)-Pv(k1)\}$$

$$i = y1 \times \{Ph(k3)-Ph(k1)\} + y2 \times \{Pv(k3)-Pv(k1)\} \quad (9)$$

When the palette combination contains four or more palettes, the combination detecting unit 13 can also obtain the estimated position of any pixel contained in each of the palettes other than the two selected palettes in like manner in accordance with the equations (9).

Referring back to FIG. 7, the combination detecting unit 13 determines whether the pixel at the estimated position (j, i) is contained in the palette candidate region for the remaining palette in the combination (step S104). If the combination contains four or more palettes, the combination detecting unit 13 determines for each remaining palette whether the pixel at the estimated position corresponding to the remaining palette is contained in the corresponding palette candidate region. If all the pixels whose positions (j, i) are estimated are contained in the corresponding palette candidate regions (Yes in step S104), the two selected pixels and the pixels whose positions are estimated are taken as candidate pixels that are likely to represent the respective palettes. Then, in output images representing the candidate pixels that are likely to correspond to the respective palettes, the combination detecting unit 13 changes the value of each of the two selected pixels and the value of the pixel at each estimated position to a value (for example, "1") that indicates that the pixel is likely to represent the corresponding palette (step S105). Each output image is, for example, a binary image of the same size as the image representing the palette, and is initially set to a value (for example, "0") that indicates that none of the pixels represents the palette. One output image is generated for each palette.

On the other hand, if even one of the pixels whose positions are estimated is not contained in the corresponding palette candidate region (No in step S104), it is highly likely that at least one of the two selected pixels or the pixel at the estimated position does not represent the corresponding palette. In this case, the combination detecting unit 13 does not change the value in the output image.

After that, the combination detecting unit 13 determines whether there is any pair of pixels remaining unselected in the two selected palette candidate region images (step S106). If there is any pair of pixels that remains unselected (Yes in step S106), the combination detecting unit 13 repeats the process that follows the step S101. On the other hand, if there is no pair of pixels remaining unselected (No in step S106), the combination detecting unit 13 writes the output image of each palette to the memory 10 (step S107).

The combination detecting unit 13 may perform the combination detection process a plurality of times by changing the palette combination. In that case, it is preferable that at least two combinations contain the same palette. For example, suppose that three combinations are set, the first combination G(1) containing the palettes k(a), k(b), and k(c), the second combination G(2) containing the palettes k(a), k(d), and k(e), and the third combination G(3) containing the palettes k(b), k(f), and k(g). In this case, candidate pixels that are likely to represent the palette k(a) are examined by using the combinations G(1) and G(2), and candidate pixels that are likely to represent the palette k(b) are examined by using the combinations G(1) and G(3).

In the present embodiment, the combination detecting unit 13 selects the combinations so that the palette whose color and position are to be detected on the image is contained in any one of the combinations.

On the other hand, the larger the number of palettes contained in one combination, the less likely it is that a pixel representing an object other than a palette will be detected as a candidate pixel. As a result, the number of combinations on which the combination detection process is performed can be reduced as the number of palettes contained in one combination becomes larger. For example, if the number of palettes contained in one combination is equal to or larger than one half of the total number of palettes contained in the color chart, the combination detecting unit 13 need only perform the combination detection process on one combination only.

The combination detecting unit 13 performs the combination detection process on each combination, generates the output image for each of the palettes contained in that combination, and stores the output image in the memory 10.

For each palette, the integrated judging unit 14 obtains the product between pixels located at corresponding positions on a plurality of output images generated for the palette. Then, the integrated judging unit 14 determines that any pixel for which the product is "1" is a pixel contained in that palette.

Reference is made back to FIGS. 6A to 6D. In the palette candidate region image 620 depicted in FIG. 6B, it is assumed that a region 623 containing a background portion whose color is similar to the color of the palette k2 is located in an area encircled by a dashed line. In this case, arbitrary pixels 616, 627, and 636 taken from the background regions 612, 623, and 632 are also arranged in the same order as the palettes k1 to k3. As a result, if the combination detection process is performed on the combination that only contains the palettes k1 to k3, the regions 612, 623, and 632 will also be judged to be likely to represent the respective palettes k1 to k3.

FIG. 9A illustrates one example of an output image generated for the palette k2 as a result of the combination detection process performed on a palette combination containing the palettes k1 to k3. FIG. 9B illustrates one example of an output image generated for the palette k2 as a result of the combination detection process performed on another palette combination containing the palette k2. FIG. 9C depicts an image generated as the product of the output image depicted in FIG. 9A and the output image depicted in FIG. 9B.

In this case, for example, in the output image 900 generated for the palette k2 as depicted in FIG. 9A, not only the region 621 but also the region 623 is also extracted as a set of pixels likely to represent the palette. However, when the combination detection process is performed on the other palette combination containing the palette k2, the likelihood of the region 623 being extracted decreases, while the region 621 is extracted as illustrated, for example, in the output image 910 of FIG. 9B. Therefore, if the product is obtained between each pair of pixels located at corresponding positions on the output images 900 and 910, the likelihood that only the region 621 actually representing the palette k2 will be extracted increases, as illustrated in the product image 920 of FIG. 9C. This increases the palette detection accuracy.

The integrated judging unit 14 generates, for each palette, the product image representing the product of the plurality of output images generated for the palette, and supplies the product image to the palette information computing unit 15 as the palette detection information representing the pixels contained in the palette. If only one output image is generated for the palette, the integrated judging unit 14 supplies the one output image as the palette detection information to the palette information computing unit 15. If the combination detecting unit 13 performs the combination detection process only on one combination, the integrated judging unit 14 may be omitted.

The palette information computing unit 15 refers to the palette detection information received for each palette from the integrated judging unit 14, and obtains the color information representing the color of the palette on the image and the position information representing the position of the palette on the image. For this purpose, the palette information computing unit 15 computes the palette color information by calculating an average or median value for each of the H, S, and V components of the pixels contained in the palette and indicated by the palette detection information. Further, for each palette, the palette information computing unit 15 obtains the centroid of the pixels contained in the palette and indicated by the palette detection information, and takes the centroid as the palette position information.

The palette information computing unit 15 supplies the color information and position information for each palette along with the identification information for the palette to the control unit 7. The palette identification information may be, for example, the number assigned to each palette in raster scan order starting with the palette located at the upper left corner of the color chart.

FIG. 10 is an operation flowchart illustrating the color chart detection process performed by the color chart detection apparatus 6.

The color chart detection apparatus 6 reads the image representing the color chart from the storage unit 5 (step S201). The color converting unit 11 converts the image from the RGB color system to the HSV color system (step S202).

For each of a predetermined number (three or more) of palettes selected from the plurality of palettes contained in the color chart, the palette color pixel extracting unit 12 extracts any pixel having a color corresponding to the palette from the image whose color system has been converted (step S203). The palette color pixel extracting unit 12 then generates for each palette a palette candidate region image representing a palette candidate region formed by a set of pixels having the same color as the palette.

The combination detecting unit 13 performs the combination detection process on at least one palette combination containing three or more palettes (step S204). The combination detecting unit 13 then generates an output image for each of the palettes contained in the palette combination.

The integrated judging unit 14 obtains for each palette the product of corresponding pixels between a plurality of output images generated for the palette, and thereby extracts any pixel that has been judged to represent the palette in all the palette combinations containing the palette (step S205). Then, the integrated judging unit 14 sends the palette detection information representing the positions of the extracted pixels for each palette to the palette information computing unit 15.

The palette information computing unit 15 computes the color information for each palette by calculating an average or median value for each of the H, S, and V components of the pixels contained in the palette. Further, the palette information computing unit 15 computes the palette position information by calculating the coordinates of the centroid of the pixels contained in the palette (step S206). Then the palette information computing unit 15 supplies the color information and position information for each palette along with the palette identification information to the control unit 7. After that, the color chart detection apparatus 6 terminates the color chart detection process.

As has been described above, the color chart detection apparatus detects, using information concerning the palette arrangement, the pixels that match the palette arrangement among the pixels having colors corresponding to the respective palettes. As a result, the color chart detection apparatus can accurately detect each individual palette contained in the color chart, even if the position of the color chart is unknown. Furthermore, since processing such as pattern matching that involves a large amount of computation need not be performed on the entire image, the color chart detection apparatus can reduce the amount of computation.

Next, a color chart detection apparatus according to a second embodiment will be described. The color chart detection apparatus according to the second embodiment detects a palette undetected in the combination detection process by identifying the position of the undetected palette based on the positions of the palettes detected in the combination detection process and on the palette arrangement.

Figure 11:
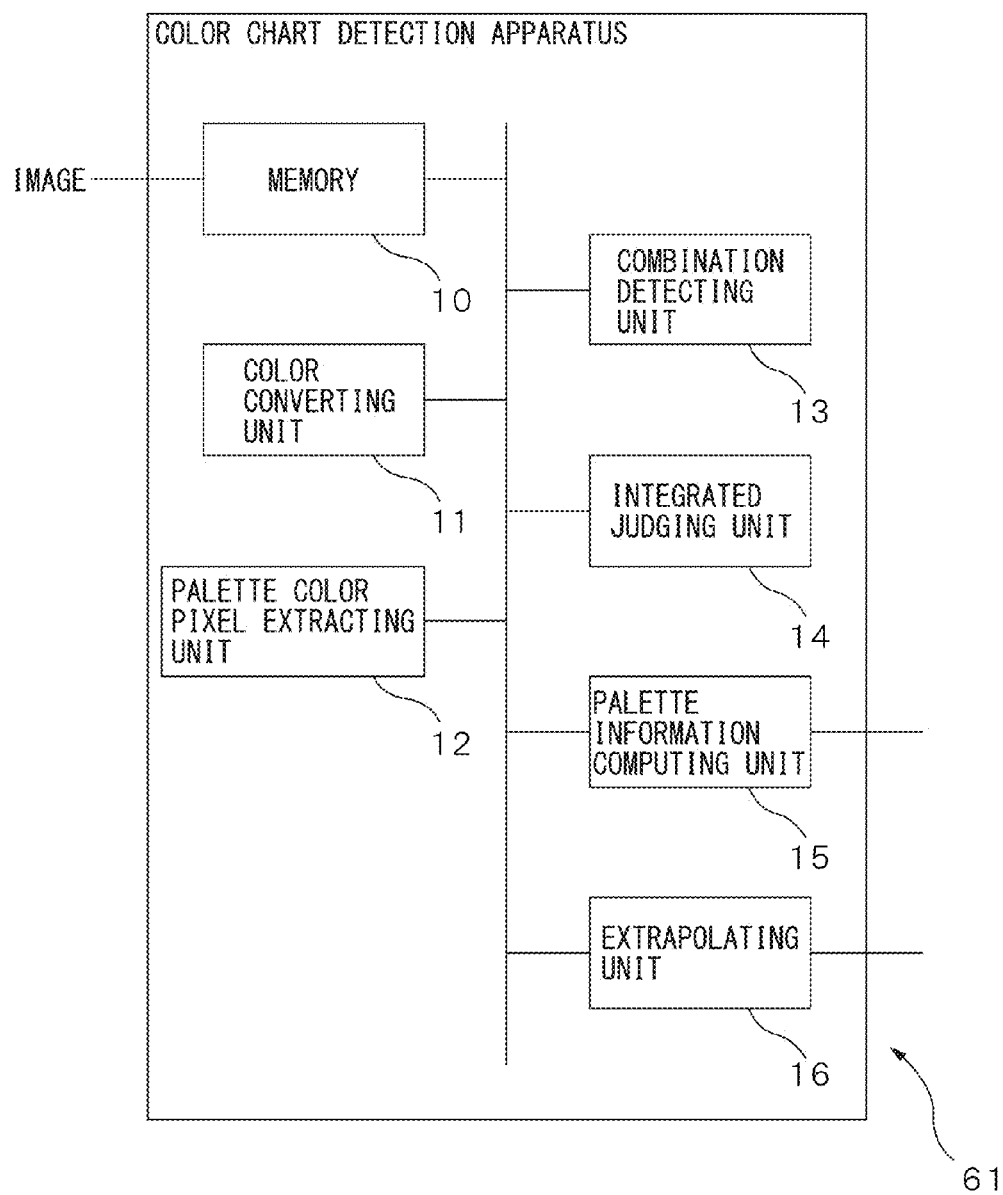
FIG. 11 is a diagram illustrating the configuration of a color chart detection apparatus according to a second embodiment.

FIG. 11 is a diagram illustrating the configuration of the color chart detection apparatus 61 according to the second embodiment. The color chart detection apparatus 61 includes a memory 10, a color converting unit 11, a palette color pixel extracting unit 12, a combination detecting unit 13, an integrated judging unit 14, a palette information computing unit 15, and an extrapolating unit 16. These units constituting the color chart detection apparatus 61 are implemented in the form of a single integrated circuit on which circuits corresponding to the respective units are integrated. Alternatively, these units constituting the color chart detection apparatus 61 may each be implemented as a separate circuit.

In FIG. 11, the component elements of the color chart detection apparatus 61 are designated by the same reference numerals as those used to designate the corresponding component elements of the color chart detection apparatus 6 illustrated in FIG. 3. The color chart detection apparatus 61 according to the second embodiment differs from the color chart detection apparatus 6 according to the first embodiment by the inclusion of the extrapolating unit 16. The following therefore describes the extrapolating unit 16 and its related parts.

The extrapolating unit 16 inserts in the equations (5) or (6) the coordinates (j1, i1) and (j2, i2) of the centroid positions of two palettes selected from the plurality of palettes whose centroids have been obtained by the palette information computing unit 15. In this way, the extrapolating unit 16 computes the amount of shift (x1, y1) by one palette in the horizontal direction on the image. Similarly, by inserting the coordinates (j1, i1) and (j2, i2) of the centroid positions of the two palettes in the equations (7) or (8), the extrapolating unit 16 computes the amount of shift (x2, y2) by one palette in the vertical direction on the image.

Next, the extrapolating unit 16 computes the coordinates (j, i) of the center position of the detection range for a given undetected palette k in accordance with the equations (9). In this case, Ph(k3) and Pv(k3) in the equations (9) represent the palette numbers of the palette k as counted from the left end and top end, respectively, of the color chart.

Based on the coordinates (j, i) of the center position of the detection range computed for the undetected palette k in accordance with the equations (9), the extrapolating unit 9 sets the detection range for the palette k on the image in accordance with the following equations.

$$Xl=j+\min(x1/2+x2/2, x1/2-x2/2, -x1/2+x2/2, -x1/2-x2/2)$$

$$Xr=j+\max(x1/2+x2/2, x1/2-x2/2, -x1/2+x2/2, -x1/2-x2/2)$$

$$Yt=j+\min(y1/2+y2/2, y1/2-y2/2, -y1/2+y2/2, -y1/2-y2/2)$$

$$Yb=j+\max(y1/2+y2/2, y1/2-y2/2, -y1/2+y2/2, -y1/2-y2/2) \quad (10)$$

where the function min(a, b, c, d) is a function that outputs the smallest value among the parameters a, b, c, and d. Further, the function max(a, b, c, d) is a function that outputs the largest value among the parameters a, b, c, and d. On the other hand, Xl and Xr respectively represent the coordinates of the left end and right end of the detection range, and Yt and Yb respectively represent the coordinates of the top end and bottom end of the detection range.

Of the pixels contained in the palette candidate region defined for the undetected palette, the extrapolating unit 16 detects those contained within the detection range as the pixels representing that palette. Then, the extrapolating unit 16 obtains the centroid of the detected pixels and takes the centroid as the palette position information. Further, the extrapolating unit 16 computes the color information for the palette by calculating an average or median value for each of the H, S, and V components of the detected pixels. The extrapolating unit 16 supplies the palette color information and position information along with the palette identification information to the control unit 7.

Figure 12:
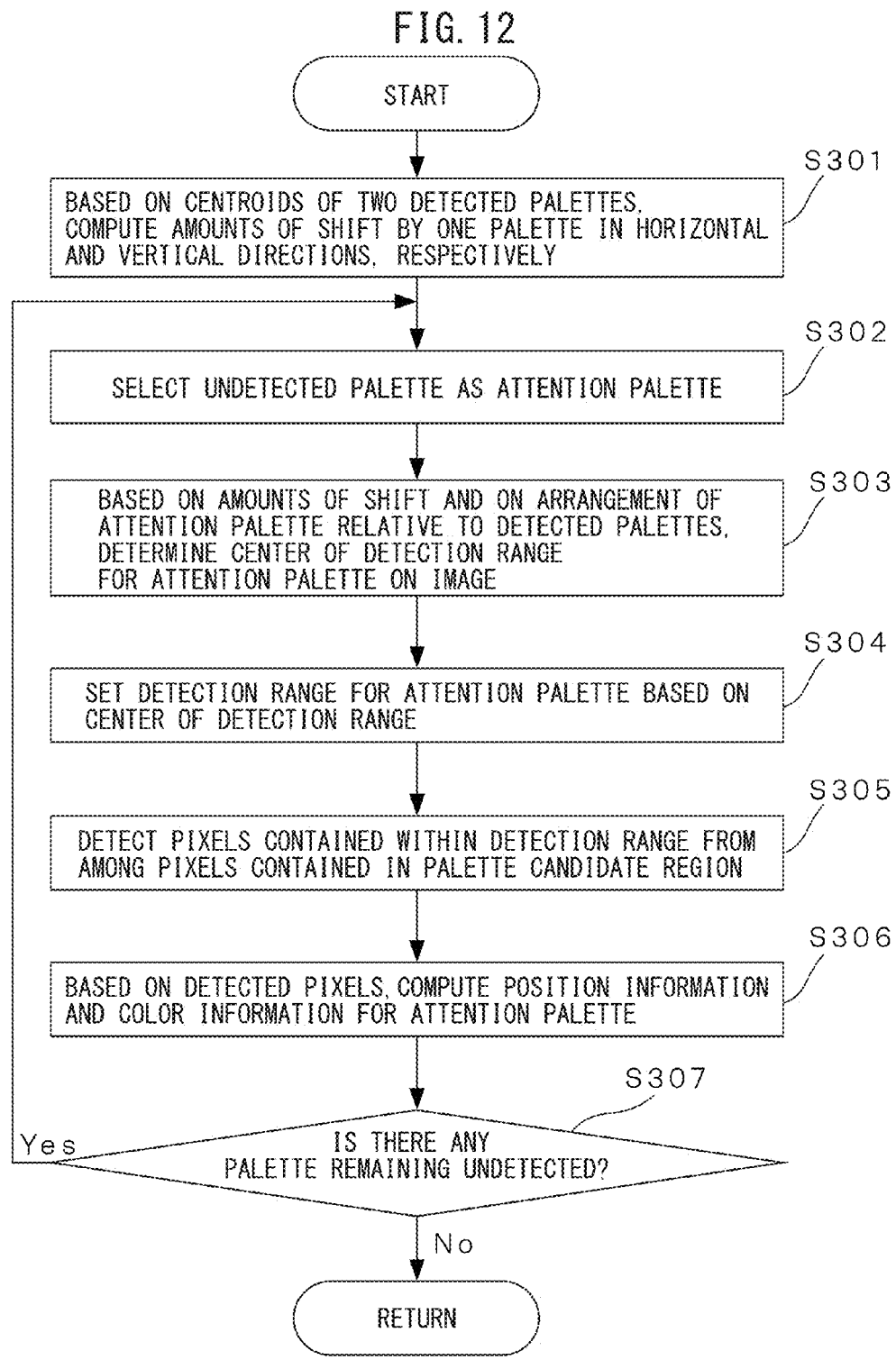
FIG. 12 is an operation flowchart illustrating an extrapolation process.

FIG. 12 is an operation flowchart illustrating the extrapolation process performed by the extrapolating unit 16. The extrapolation process is performed, for example, immediately following the step S206 in the color chart detection process illustrated in FIG. 10.

Based on the centroids of two palettes selected from the palettes detected in the preceding step S206, the extrapolating unit 16 computes the amount of shift (x1, y1) by one palette in the horizontal direction and the amount of shift (x2, y2) by one palette in the vertical direction (step S301). Then, the extrapolating unit 16 sets one of undetected palettes as the attention palette (step S302).

Based on the amounts of shift, (x1, y1) and (x2, y2), and on the arrangement of the attention palette relative to the detected palettes, the extrapolating unit 16 determines the center of the detection range for the attention palette on the image (step S303). Then, based on the center of the detection range, the extrapolating unit 16 sets the detection range so that the entirety of the attention palette is contained within the detection range (step S304).

Of the pixels contained in the palette candidate region defined for the attention palette, the extrapolating unit 16 detects those contained within the detection range as the pixels representing the attention palette (step S305). Then, based on the centroid and the color components of the detected pixels, the extrapolating unit 16 computes the position information and color information for the attention palette (step S306). The extrapolating unit 16 supplies the position information and color information to the control unit 7 along with the identification information of that palette.

After that, the extrapolating unit 16 determines whether there is any palette remaining undetected (step S307). If there is a palette remaining undetected (Yes in step S307), the extrapolating unit 16 repeats the process starting from step S302. On the other hand, if there is no longer any palette remaining undetected (No in step S307), the extrapolating unit 16 terminates the extrapolation process.

According to this embodiment, the color chart detection apparatus can compute the position information and color information for any palette undetected in the combination detection process with a smaller amount of computation than that required in the combination detection process.

According to a modified example, the extrapolating unit 16 may perform labeling on the pixels detected within the detection range and may thereby detect the largest set among mutually adjacent sets of detected pixels. Then, the extrapolating unit 16 may obtain the color information and position information, based only on the pixels contained in the largest set. The extrapolating unit 16 can more accurately detect only the pixels representing the palette to be detected, even when an object (including another palette adjacent to the palette to be detected) having a color close to the color of the palette to be detected is located in the vicinity of the palette.

Next, a color chart detection apparatus according to a third embodiment will be described. The color chart detection apparatus according to the third embodiment aims to reduce the amount of computation by generating a reduced image for each palette candidate region image and by performing the combination detection process on the reduced image.

Figure 13:
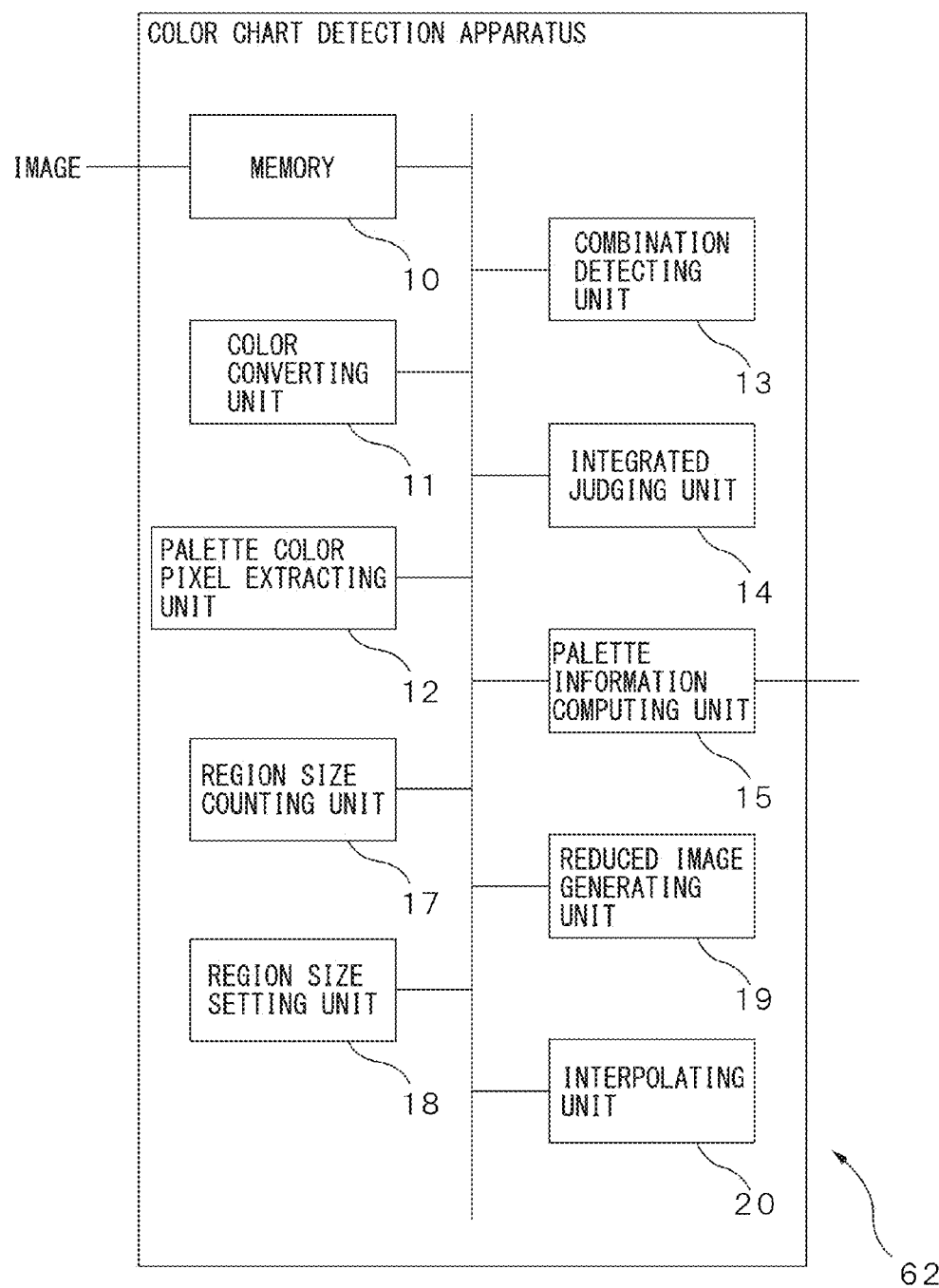
FIG. 13 is a diagram illustrating the configuration of a color chart detection apparatus according to a third embodiment.

FIG. 13 is a diagram illustrating the configuration of the color chart detection apparatus 62 according to the third embodiment. The color chart detection apparatus 62 includes a memory 10, a color converting unit 11, a palette color pixel extracting unit 12, a combination detecting unit 13, an integrated judging unit 14, a palette information computing unit 15, a region size counting unit 17, a region size setting unit 18, a reduced image generating unit 19, and an interpolating unit 20. These units constituting the color chart detection apparatus 62 are implemented in the form of a single integrated circuit on which circuits corresponding to the respective units are integrated. Alternatively, these units constituting the color chart detection apparatus 62 may each be implemented as a separate circuit.

In FIG. 13, the component elements of the color chart detection apparatus 62 are designated by the same reference numerals as those used to designate the corresponding component elements of the color chart detection apparatus 6 illustrated in FIG. 3. The color chart detection apparatus 62 according to the third embodiment differs from the color chart detection apparatus 6 according to the first embodiment by the inclusion of the region size counting unit 17, region size setting unit 18, reduced image generating unit 19, and interpolating unit 20. The following therefore describes the region size counting unit 17, region size setting unit 18, reduced image generating unit 19, interpolating unit 20, and their related parts.

The region size counting unit 17 labels the pixels having colors corresponding to the palette contained in each palette candidate region image, and assigns a different label to each independent palette candidate region. Then, for each palette candidate region labeled, the region size counting unit 17 counts the number of pixels belonging to the palette candidate region, and takes the number of pixels as the size of the palette candidate region. The region size counting unit 17 then creates, for each palette candidate region, a size table for mapping the label to the region size, and stores the size table in the memory 10. For example, referring back to FIG. 6A, in the palette candidate region image 610, different labels are assigned to the different regions 611 and 612. Then, the number of pixels contained in the region 611 represents the size of the region 611, and the number of pixels contained in the region 612 represents the size of the region 612.

The region size setting unit 18 sets, for each reduced image, the upper limit and lower limit of the palette candidate region to be detected in the reduced image. For example, a first reduced image with a reduction ratio of 1/8 (in terms of length), a second reduced image with a reduction ratio of 1/4 (in terms of length), a third reduced image with a reduction ratio of 1/2 (in terms of length), and a fourth reduced image with a reduction ratio of 1/1 are used. Using each reduced image, the color chart detection apparatus 62 detects a color chart having a size that falls within the range of Cmax % at maximum to Cmin % at minimum relative to the number of pixels in the original image representing the color chart. In this case, in the first reduced image with the reduction ratio of 1/8, the upper limit value of the detection size for one palette is given by {Cmax/100×Total/N}, while the lower limit value of the detection size is given by {Cmax/100×Total/N}/4. N represents the total number of palettes contained in the color chart. On the other hand, Total represents the number pixels in the original image representing the color chart. In the second reduced image with the reduction ratio of 1/4, the upper limit value of the detection size for one palette is given by {Cmax/100× Total/N}/4, while the lower limit value of the detection size is given by {Cmax/100×Total/N}/16. Further, in the third reduced image with the reduction ratio of 1/2, the upper limit value of the detection size for one palette is given by {Cmax/100× Total/N}/16, while the lower limit value of the detection size is given by {Cmax/100×Total/N}/64. Finally, in the fourth reduced image with the reduction ratio of 1/1, i.e., in the original image, the upper limit value of the detection size for one palette is given by {Cmax/100×Total/N}/64, while the lower limit value of the detection size is given by {Cmin/100×Total/N}.

For example, suppose that Cmax is 100% and Cmin is 0%; then, in the first reduced image, the detection size is in the range of {(number of pixels in original image)/N} to {(number of pixels in original image)/N}/4. In the second reduced image, the detection size is in the range of {(number of pixels in original image)/N}/4 to {(number of pixels in original image)/N}/16. Similarly, in the third reduced image, the detection size is in the range of {(number of pixels in original image)/N}/16 to {(number of pixels in original image)/N}/64. In the fourth reduced image, a palette candidate region having a smaller number of pixels than {(number of pixels in original image)/N}/64 is the region to be detected.

The reduced image generating unit 19 generates a reduced image for each palette candidate region image. For example, the reduced image generating unit 19 first generates the first reduced image. Then, the reduced image generating unit 19 refers to the size table and the label of an arbitrary pixel for each palette candidate region and, if the label matches the palette candidate region having the detection size set by the region size setting unit 18, then stores "1" for the corresponding pixel in the reduced image. The reduced image generating unit 19 stores the first reduced image generated for each palette candidate region image in the memory 10.

The color chart detection apparatus 62 processes the first reduced image in accordance with the processes performed by the combination detecting unit 13 and the integrated judging unit 14. Then, if the size of the color chart falls between the size equal to the size of the entire image and the size equal to one quarter of the size of the image in terms of area ratio, each palette contained in the color chart will be detected. In this case, the size of the output image of each palette is also the same as the size of the first reduced image. Further, in this case, any palette candidate region having a size falling outside the upper or lower limit of the detection size has been removed by the reduced image generating unit 19, and the number of pixels to be handled is reduced to 1/8×1/8=1/64. This serves to reduce the number of times that the process of steps S102 to S106 is repeated in the combination detection process depicted in FIG. 7.

If the number of pixels detected based on the first reduced image is not smaller than the lower limit value of the detection size multiplied by the reduction ratio (1/8), the interpolating unit 20 obtains the coordinates of each pixel in the original image by multiplying the horizontal and vertical coordinates of the pixel by 8. The interpolating unit 20 passes the coordinates of each detected pixel to the palette information computing unit 15. The palette information computing unit 15 computes the position information and color information for each palette from the detected pixels. Then, the color chart detection apparatus 62 terminates the color chart detection process.

On the other hand, if the number of detected pixels is smaller than the lower limit value of the detection size multiplied by the reduction ratio (1/8), it is determined that the palette candidate region having the detection size does not actually contain any palette. Then, the color chart detection apparatus 62 multiplies the denominator M of the reduction ratio (1/M) (in terms of length) by 1/2.

The region size setting unit 18 sets the image size and the upper limit value {Cmax/100×(number of pixels in original image)/N}/4 and lower upper limit value {Cmax/100×(number of pixels in original image)/N}/16 of the detection size to be used in the second reduced image.

After that, the reduced image generating unit 19 generates, for each palette candidate region image, the second reduced image having a reduction ratio of 1/4 (in terms of length) and representing only the palette candidate region having the detection size set by the region size setting unit 18. Then, the reduced image generating unit 19 stores the second reduced image generated for each palette candidate region image in the memory 10.

The color chart detection apparatus 62 processes the second reduced image in like manner in accordance with the processes performed by the combination detecting unit 13, the integrated judging unit 14, and the interpolating unit 20. Then, if the size of the color chart falls between the size equal to one quarter of the size of the entire image and the size equal to one sixteenth of the size of the image in terms of area ratio, each palette contained in the color chart will be detected. In this case, any palette candidate region having a size falling outside the upper or lower limit of the detection size has been removed by the reduced image generating unit 19, and the number of pixels to be handled is reduced to 1/4×1/4=1/16 of that in the original image. This serves to reduce the number of times that the process of steps S102 to S106 is repeated in the combination detection process depicted in FIG. 7.

If the number of pixels detected based on the second reduced image is not smaller than the lower limit value of the detection size multiplied by the reduction ratio (1/4), the interpolating unit 20 obtains the coordinates of each pixel in the original image by multiplying the horizontal and vertical coordinates of the pixel by 4. The interpolating unit 20 passes the coordinates of each detected pixel to the palette information computing unit 15. The palette information computing unit 15 computes the position information and color information for each palette from the detected pixels. Then, the color chart detection apparatus 62 terminates the color chart detection process.

On the other hand, if the number of detected pixels is smaller than the lower limit value of the detection size multiplied by the reduction ratio (1/4), it is determined that the palette candidate region having the detection size does not actually contain any palette. Then, the color chart detection apparatus 62 multiplies the denominator M of the reduction ratio (1/M) (in terms of length) by 1/2. After that, the reduced image generating unit 19 generates, for each palette candidate region image, the third reduced image having a reduction ratio of 1/2 (in terms of length) and representing only the palette candidate region having the detection size set for the third reduced image by the region size setting unit 18. Then, the reduced image generating unit 19 stores the third reduced image generated for each palette candidate region image in the memory 10.

The color chart detection apparatus 62 processes the third reduced image in like manner in accordance with the processes performed by the combination detecting unit 13, the integrated judging unit 14, and the interpolating unit 20. Then, if the size of the color chart falls between the size equal to 1/16 of the size of the entire image and the size equal to 1/64 of the size of the image in terms of area ratio, each palette contained in the color chart will be detected.

If the number of pixels detected based on the third reduced image is not smaller than the lower limit value of the detection size multiplied by the reduction ratio (1/2), the interpolating unit 20 obtains the coordinates of each pixel in the original image by multiplying the horizontal and vertical coordinates of the pixel by 2. The interpolating unit 20 passes the coordinates of each detected pixel to the palette information computing unit 15. The palette information computing unit 15 computes the position information and color information for each palette from the detected pixels. Then, the color chart detection apparatus 62 terminates the color chart detection process.

On the other hand, if the number of detected pixels is smaller than the lower limit value of the detection size multiplied by the reduction ratio (1/2), it is determined that the palette candidate region having the detection size does not actually contain any palette. Then, the color chart detection apparatus 62 multiplies the denominator M of the reduction ratio (1/M) (in terms of length) by 1/2. After that, using the combination detecting unit 13, the integrated judging unit 14, and the interpolating unit 20, the color chart detection apparatus 62 processes the fourth reduced image, i.e., the image of the original size, only for the palette candidate region having the detection size set for the fourth reduced image by the region size setting unit 18. In this way, each palette contained in the color chart whose size is smaller than 1/64 of the entire image is detected.

Figure 14:
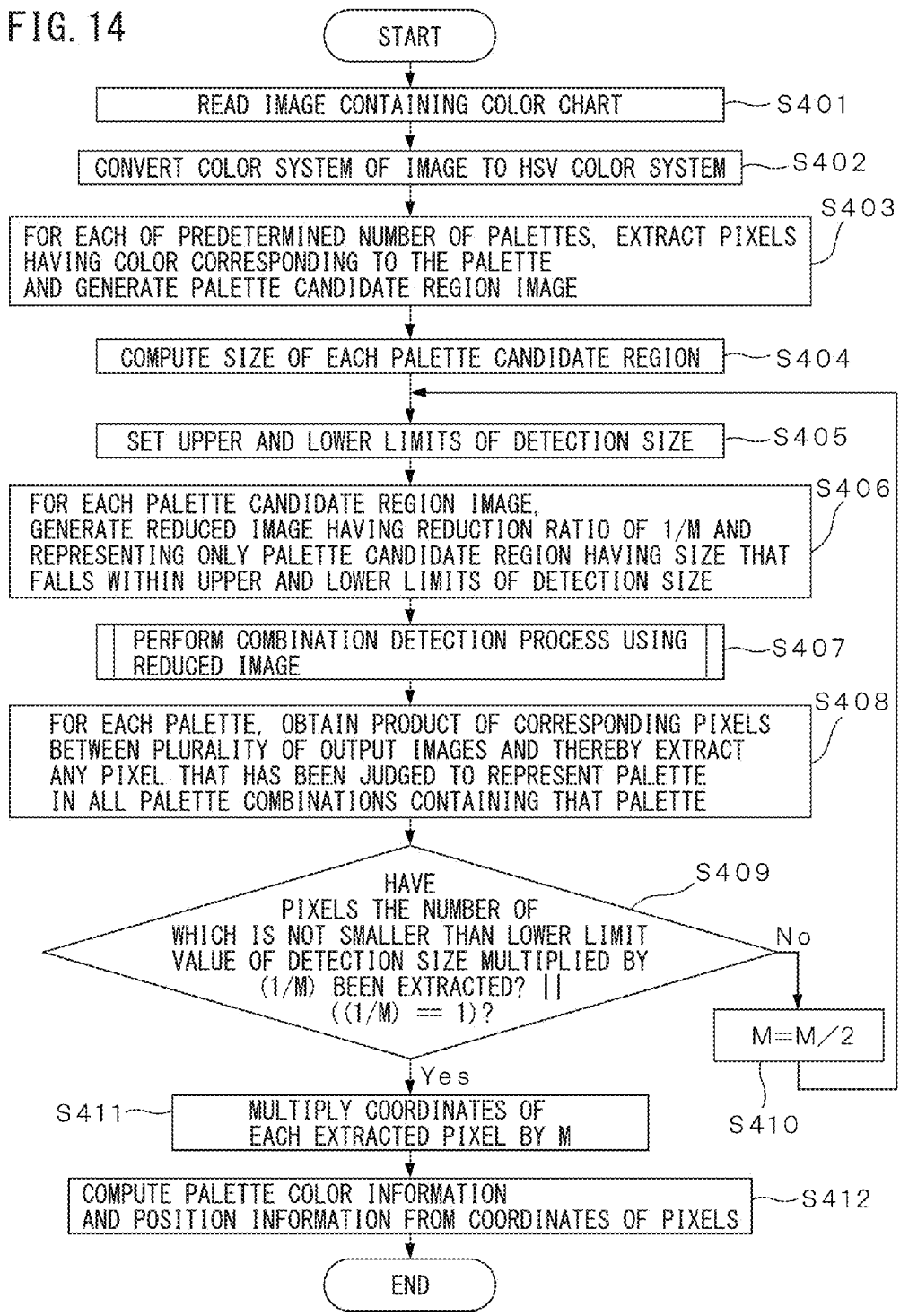
FIG. 14 is an operation flowchart illustrating a color chart detection process according to the third embodiment.

FIG. 14 is an operation flowchart illustrating the color chart detection process performed by the color chart detection apparatus 62 according to the third embodiment.

The color chart detection apparatus 62 reads the image representing the color chart from the storage unit 5 (step S401). The color converting unit 11 converts the image from the RGB color system to the HSV color system (step S402).

For each of a predetermined number (three or more) of palettes selected from the plurality of palettes contained in the color chart, the palette color pixel extracting unit 12 extracts any pixel having a color corresponding to the palette from the image whose color system has been converted (step S403). The palette color pixel extracting unit 12 then generates for each palette a palette candidate region image representing a palette candidate region formed by a set of pixels having the same color as the palette.

The region size counting unit 17 labels the pixels having color corresponding to the palette contained in each palette candidate region image, and assigns a different label to each independent palette candidate region. Then, for each palette candidate region labeled, the region size counting unit 17 counts the number of pixels belonging to the palette candidate region, and takes the number of pixels as the size of the palette candidate region (step S404). The region size counting unit 17 then creates, for each palette candidate region, a size table for mapping the label to the region size, and stores the size table in the memory 10.

The region size setting unit 18 sets the upper limit and lower limit of the size of the palette candidate region to be detected in a reduced image (step S405).

The reduced image generating unit 19 generates, for each palette candidate region image, a reduced image having a reduction ratio of 1/M and representing only the palette candidate region having a size that falls within the upper and lower limits of the detection size (step S406).

The combination detecting unit 13 performs the combination detection process on at least one palette combination by using the reduced image (step S407). The combination detecting unit 13 then generates an output image for each of the palettes contained in the palette combination.

The integrated judging unit 14 obtains for each palette the product of corresponding pixels between a plurality of output images generated for the palette, and thereby extracts any pixel that has been judged to represent the palette in all the palette combinations containing that palette (step S408). Then, the integrated judging unit 14 sends the palette detection information indicating the positions of the extracted pixels for each palette to the interpolating unit 20.

The interpolating unit 20 determines whether the palette detection information contains pixels the number of which is not smaller than the lower limit value of the detection size multiplied by the reduction ratio (1/M) or the reduction ratio (1/M) is 1 or not (step S409). If the palette position information does not contain pixels the number of which corresponds to the lower limit value of the detection size, and if the reduction ratio (1/M) is not 1 (No in step S409), the color chart detection apparatus 62 reduces M to 1/2 (step S410). After that, the color chart detection apparatus 62 repeats the process starting from step S405.

On the other hand, if the palette position information contains pixels the number of which corresponds to the lower limit value of the detection size, or if the reduction ratio (1/M) is 1 (Yes in step S409), the interpolating unit 20 multiplies the vertical and horizontal coordinates of each pixel contained in the palette position information by M (step S411). Then, the interpolating unit 20 sends the coordinates of the pixels to the palette information computing unit 15.

The palette information computing unit 15 computes the color information for each palette by calculating an average or median value for each of the H, S, and V components of the pixels. Further, the palette information computing unit 15 computes the palette position information by calculating the coordinates of the centroid of the pixels contained in the palette (step S412). Then the palette information computing unit 15 supplies the color information and position information for each palette to the control unit 7. After that, the color chart detection apparatus 62 terminates the color chart detection process.

Since the color chart detection apparatus according to the third embodiment performs the combination detection process, etc., on the reduced image, the number of pixel combinations used to examine whether the arrangement of the pixels matches the arrangement of the palettes can be reduced. As a result, the color chart detection apparatus can reduce the amount of computation.

According to a modified example of the third embodiment, the reduced image generating unit 19 may generate the first reduced image for the image converted by the color converting unit 11 to the HSV color system. In this case, the palette color pixel extracting unit 12, the combination detecting unit 13, and the integrated judging unit 14 perform their respective processes on the first reduced image. Then, the reduced image generating unit 19 generates the second and third reduced images sequentially by progressively reducing the reduction ratio until the pixels representing the palette are detected, and the respective processes are performed on each reduced image.

According to another modified example, the color chart detection apparatus according to the third embodiment may also include the extrapolating unit provided in the second embodiment.

Further, according to another modified example of each of the above embodiments, the combination detecting unit 13 may set the value of the pixel at the estimated position and the value of each of the two pixels selected from the respective palette candidate region images to "2" in step S105 in the combination detection process depicted in FIG. 7. In this way, the combination detecting unit 13 can differentiate the pixels likely to represent the palette from the pixels not likely, without having to generate an output image separately from the palette candidate region image. Then, if there is no longer any pair of pixels remaining unselected in step S106, the combination detecting unit 13 subtracts 1 from the value of each pixel having a positive value among the pixels in the palette candidate region image corresponding to each palette contained in the palette combination under consideration. As a result, in the palette candidate region image, as in the output image, only the pixels judged from the palette arrangement to be likely to represent the palette are assigned the value "1". This makes it possible to reduce the memory capacity of the memory 10, because the color chart detection apparatus need not generate an output image separately from the palette candidate region image.

Further, after using the palette candidate region image in the combination detection process for one palette combination, the combination detecting unit 13 may use the same palette candidate region image for another palette combination. By so doing, the number of pixel pairs to be examined in the second and subsequent cycles of the combination detection process can be reduced, because the pixels judged not to represent the palette from the palette arrangement have been removed in the previous cycle of the detection process.

Since this is equivalent to simultaneously performing the same process as that performed by the integrated judging, the palette candidate region image produced when the combination detection process is completed on all the palette combinations is equivalent to the product image that the integrated judging unit outputs. Therefore, the integrated judging unit may be omitted. This also serves to reduce the overall amount of computation in the color chart detection process.

According to still another modified example, the combination detecting unit 13 may selects, from among all the palette candidate region images, two palette candidate region images in order of increasing number of pixels contained in the palette candidate region. Then, the combination detecting unit 13 may perform the combination detection process on a palette combination containing the two palettes corresponding to the two palette candidate region images. In this way, since the combination detecting unit 13 can minimize the number of pixel pairs to be examined to determine whether the arrangement of the pixels matches the arrangement of the palettes, the amount of computation can be further reduced.

The functions of the various units constituting the color chart detection apparatus according to each of the above embodiments or their modified examples may be implemented by a computer program executed on a processor. Such a computer program may be provided in the form recorded on a computer readable recording medium such as a magnetic recording medium or an optical recording medium.

FIG. 15 is a diagram illustrating the configuration of a computer that operates as the color chart detection apparatus by executing a computer program for implementing the function of each unit included in the color chart detection apparatus according to each of the above embodiments or their modified examples.

The computer 100 includes a user interface unit 101, a communication interface unit 102, a storage unit 103, a storage media access device 104, and a processor 105. The processor 105 is connected to the user interface unit 101, communication interface unit 102, storage unit 103, and storage media access device 104, for example, via a bus.

The user interface unit 101 includes, for example, an input device such as a keyboard and a mouse, and a display device such as a liquid crystal display. Alternatively, the user interface unit 101 may include a device, such as a touch panel display, into which an input device and a display device are integrated. The user interface unit 101 generates, for example, in response to a user operation, a signal for selecting an image from which a color chart is to be detected and an operation signal for starting the color chart detection process, and supplies these signals to the processor 105.

The communication interface unit 102 may include a communication interface for connecting the computer 100 to an imaging apparatus (not depicted), and a control circuit for the communication interface. Such a communication interface may be, for example, a Universal Serial Bus (USB) interface.

Further, the communication interface unit 102 may include a communication interface for connecting to a communication network conforming to a communication standard such as the Ethernet (registered trademark), and a control circuit for the communication interface. In this case, the communication interface unit 102 acquires an image representing a color chart from another apparatus connected to the communication network, and stores the image in the storage unit 103. The communication interface unit 102 may receive from the processor the identification information, position information, and color information of each palette contained in the color chart and may transmit them to another apparatus via the communication network.

The storage unit 103 includes, for example, a readable/writable semiconductor memory and a read-only semiconductor memory. The storage unit 103 stores a computer program for implementing the color chart detection process to be executed on the processor 105, and also stores intermediate calculation results obtained during the execution of the color chart detection process. The storage unit 103 also stores images received via the communication interface unit 102 or information such as the identification information, position information, and color information of each palette contained in the color chart detected by the processor 105.

The storage media access device 104 is a device that accesses a storage medium 106 such as a magnetic disk, a semiconductor memory card, or an optical storage medium. The storage media access device 104 accesses the storage medium 106 to read out, for example, the color chart detection computer program to be executed on the processor 105 and passes the readout computer program to the processor 105.

The processor 105 executes the color chart detection computer program according to each of the above embodiments or their modified examples, and obtains the position information and color information of each palette of the color chart on the image. The processor 105 stores the identification information, position information, and color information of each palette in the storage unit 103 or transmits them to another apparatus via the communication interface unit 102.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of superiority and inferiority of the invention. Although the embodiments of the present invention have been described in detail, it should be understood that the various changes, substitutions, and alterations could be made hereto without departing from the spirit and scope of the invention.

What is claimed is:

1. A color chart detection apparatus that detects a color chart from an image representing the color chart, the color chart including a plurality of palettes arranged in a predefined order, the apparatus comprising:
    a processor configured to:
        extract, for each of a predetermined number, not smaller than three, of palettes selected from among the plurality of palettes, any pixel having a color component corresponding to the palette from the image;
        select at least three palettes from the predetermined number of palettes to form a first group, color components of the palettes included in the first group being different from each other,
        detect, when a combination of pixels selected on a palette-by-palette basis from among the pixels extracted for the respective palettes included in the first group is arranged in accordance with the predefined order, each of the pixels included in the combination as being a first candidate pixel; and
        compute, based on the first candidate pixel, color information representing color of the palette corresponding to the first candidate pixel on the image and position information representing position of the corresponding palette on the image.

2. The color chart detection apparatus according to claim 1, wherein the processor is further configured to
    select at least three palettes from the predetermined number of palettes to form a second group such that the first group and the second group both include a first palette,
    detect, when a combination of pixels selected on a palette-by-palette basis from among the pixels extracted for the respective palettes included in the second group is arranged in accordance with the predefined order, each of the pixels included in the combination as being a second candidate pixel, and
    judge, when a pixel detected as the first candidate pixel for the first palette in the first group is detected as the second candidate pixel for the first palette in the second group, the detected pixel to be a pixel representing the first palette.

3. The color chart detection apparatus according to claim 1, wherein the detecting each of the pixels included in the combination as being the first candidate pixel comprises
    estimating, based on the predefined order and on a first pixel and a second pixel respectively taken from the pixels extracted for two palettes selected in order of increasing number of extracted pixels from among the at least three palettes included in the first group, an estimated position on the image for another palette included in the first group, and
    detecting, when a pixel located at the estimated position is a third pixel extracted for the other palette in the first group, the first, second, and third pixels as being the first candidate pixels for the respective palettes included in the first group.

4. The color chart detection apparatus according to claim 1, wherein the processor is further configured to
    estimate position and range on the image for an undetected palette not included in the first group, and
    compute color information representing a color of the undetected palette on the image, based on a pixel included in the estimated position and range and having a color corresponding to the undetected palette.

5. The color chart detection apparatus according to claim 1,
    wherein the processor is further configured to generate a reduced image by reducing in accordance with a preset reduction ratio either the image representing the color chart or a palette candidate region image representing a set of pixels extracted for each of the predetermined number of palettes, and
    wherein the detecting each of the pixels included in the combination as being the first candidate pixel detects, based on the reduced image, first candidate pixels for each of the palettes included in the first group, and
    wherein when the number of the first candidate pixels detected for each of the palettes included in the first group is smaller than a predetermined number, the processor generates the reduced image by reducing the reduction ratio and, based on the reduced image generated in accordance with the reduced reduction ratio, and detects the first candidate pixels for each of the palettes included in the first group.

6. The color chart detection apparatus according to claim 1, wherein the processor is further configured to form the first group by including therein two palettes selected from the predetermined number of palettes in order of increasing number of pixels extracted by the processor.

7. A color chart detection method that detects a color chart from an image representing the color chart, the color chart having a plurality of palettes arranged in a predefined order, the method comprising:

extracting, for each of a predetermined number, not smaller than three, of palettes selected from among the plurality of palettes, any pixel having a color component corresponding to the palette from the image by a processor;

selecting at least three palettes from the predetermined number of palettes to form a first group by the processor, color components of the palettes included in the first group being different from each other;

detecting, when a combination of pixels selected on a palette-by-palette basis from among the pixels extracted for the respective palettes included in the first group is arranged in accordance with the predefined order, each of the pixels included in the combination as being a first candidate pixel by the processor; and computing, based on the first candidate pixel, color information representing a color of the palette corresponding to the first candidate pixel on the image and position information representing position of the corresponding palette on the image by the processor.

8. The color chart detection method according to claim 7, further comprising:

selecting at least three palettes from the predetermined number of palettes to form a second group such that the first group and the second group both include a first palette, by the processor;

detecting, when a combination of pixels selected on a palette-by-palette basis from among the pixels extracted for the respective palettes included in the second group is arranged in accordance with the predefined order, each of the pixels included in the combination as being a second candidate pixel that is likely to represent a corresponding one of the palettes included in the second group by the processor; and judging, when a pixel detected as the first candidate pixel for the first palette in the first group is detected as the second candidate pixel for the first palette in the second group, the detected pixel to be a pixel representing the first palette by the processor.

9. The color chart detection method according to claim 7, wherein the detecting each of the pixels included in the combination as being the first candidate pixel, based on the predefined order and on a first pixel and a second pixel respectively taken from the pixels extracted for two palettes selected in order of increasing number of extracted pixels from among the at least three palettes included in the first group, estimates position on the image for another palette included in the first group and, when a pixel located at the estimated position is a third pixel extracted for the other palette in the first group, detects the first, second, and third pixels as being the first candidate pixels for the respective palettes included in the first group.

10. The color chart detection method according to claim 7, further comprising:

estimating position and range on the image for an undetected palette not included in the first group by the processor; and computing color information representing a color of the undetected palette on the image, based on a pixel included in the estimated position and range and having a color corresponding to the undetected palette by the processor.

11. The color chart detection method according to claim 7, further comprising:

generating a reduced image by reducing in accordance with a preset reduction ratio either the image representing the color chart or a palette candidate region image representing a set of pixels extracted for each of the predetermined number of palettes by the processor, and wherein based on the reduced image, the detecting each of the pixels included in the combination as being the first candidate pixel detects first candidate pixels for each of the palettes included in the first group, and when the number of the first candidate pixels detected for each of the palettes included in the first group is smaller than a predetermined number, the generating the reduced image generates the reduced image by reducing the reduction ratio and, based on the reduced image generated in accordance with the reduced reduction ratio, the detecting each of the pixels included in the combination as being the first candidate pixel for the first group detects the first candidate pixels for each of the palettes included in the first group.

12. The color chart detection method according to claim 7, further comprising:

forming the first group by including therein two palettes selected from the predetermined number of palettes in order of increasing number of the extracted pixels by the processor.

13. A non-transitory computer-readable recording medium having recorded thereon a color chart detection computer program that causes a computer to execute a process comprising:

from an image representing a color chart having a plurality of palettes arranged in a predefined order, extracting any pixel having a color component corresponding to each designated one of a predetermined number, not smaller than three, of palettes selected from among the plurality of palettes;

selecting at least three palettes from the predetermined number of palettes to form a first group, color components of the palettes included in the first group being different from each other;

detecting, when a combination of pixels selected on a palette-by-palette basis from among the pixels extracted for the respective palettes included in the first group is arranged in accordance with the predefined order, each of the pixels included in the combination as being a first candidate pixel; and computing, based on the first candidate pixel, color information representing a color of the palette corresponding to the first candidate pixel on the image and position information representing position of the corresponding palette on the image.

* * * * *